United States Patent
Lewin et al.

(10) Patent No.: US 11,496,864 B2
(45) Date of Patent: Nov. 8, 2022

(54) METHOD AND SYSTEM FOR ACCESSING HISTORICAL SENSOR DATA WITHOUT LOCATION SERVICES

(71) Applicant: Cambridge Mobile Telematics Inc., Cambridge, MA (US)

(72) Inventors: Matthew Evan Lewin, Westford, MA (US); Joseph Patrick Adelmann, Lexington, MA (US); William Ryan Kreamer, Melrose, MA (US); William Abildgaard, Jr., Waltham, MA (US); Ankit Singhania, Somerville, MA (US); Bryan Scott, Boston, MA (US)

(73) Assignee: CAMBRIDGE MOBILE TELEMATICS INC., Cambridge, MA (US)

( * ) Notice: Subject to any disclaimer, the term of this patent is extended or adjusted under 35 U.S.C. 154(b) by 0 days.

(21) Appl. No.: 17/505,353

(22) Filed: Oct. 19, 2021

(65) Prior Publication Data

US 2022/0124454 A1    Apr. 21, 2022

Related U.S. Application Data

(60) Provisional application No. 63/124,675, filed on Dec. 11, 2020, provisional application No. 63/093,704, filed on Oct. 19, 2020.

(51) Int. Cl.
*H04W 4/02* (2018.01)
*G16Y 20/20* (2020.01)
(Continued)

(52) U.S. Cl.
CPC ............ *H04W 4/027* (2013.01); *G16Y 20/10* (2020.01); *G16Y 20/20* (2020.01); *H04W 64/006* (2013.01)

(58) Field of Classification Search
CPC ....... H04W 92/18; H04W 24/08; H04W 4/40; H04W 24/10; H04W 72/02; H04W 4/027;
(Continued)

(56) References Cited

U.S. PATENT DOCUMENTS 8,560,229 B1    10/2013    Lee et al.
2008/0234935 A1    9/2008    Wolf et al.
(Continued)

FOREIGN PATENT DOCUMENTS

WO    2020128455 A2    6/2020

OTHER PUBLICATIONS

PCT/US2021/055636, "International Search Report and Written Opinion", dated Jan. 14, 2022, 14 pages.

*Primary Examiner* — Kwasi Karikari
(74) *Attorney, Agent, or Firm* — Kilpatrick Townsend & Stockton LLP

(57) ABSTRACT

A method includes receiving, by a mobile device, a notification, executing, in response to receiving the notification, a data collection application over a time interval, and requesting, by the data collection application, sensor measurements from an operating system of the mobile device. The sensor measurements are collected prior to receiving the notification and before execution of the data collection application. The method also includes receiving, by the data collection application and from the operating system, a set of sensor measurements and transmitting, by the data collection application, the sensor measurements to a server during the time interval. The data collection application terminates upon expiration of the time interval.

20 Claims, 12 Drawing Sheets

(51) Int. Cl.
*H04W 64/00* (2009.01)
*G16Y 20/10* (2020.01)

(58) Field of Classification Search
CPC ......... H04W 4/38; H04W 4/80; H04W 24/02; H04W 4/023; H04W 4/025
See application file for complete search history.

(56) References Cited

U.S. PATENT DOCUMENTS

| | | |
|---|---|---|
| 2013/0265225 A1 | 10/2013 | Nasiri et al. |
| 2017/0063606 A1 | 3/2017 | Babu |
| 2017/0210290 A1* | 7/2017 | Cordova .................. B60Q 9/00 |
| 2017/0210323 A1* | 7/2017 | Cordova .............. G08G 1/0141 |
| 2018/0354525 A1* | 12/2018 | Lindelof ............... B60W 40/09 |

* cited by examiner

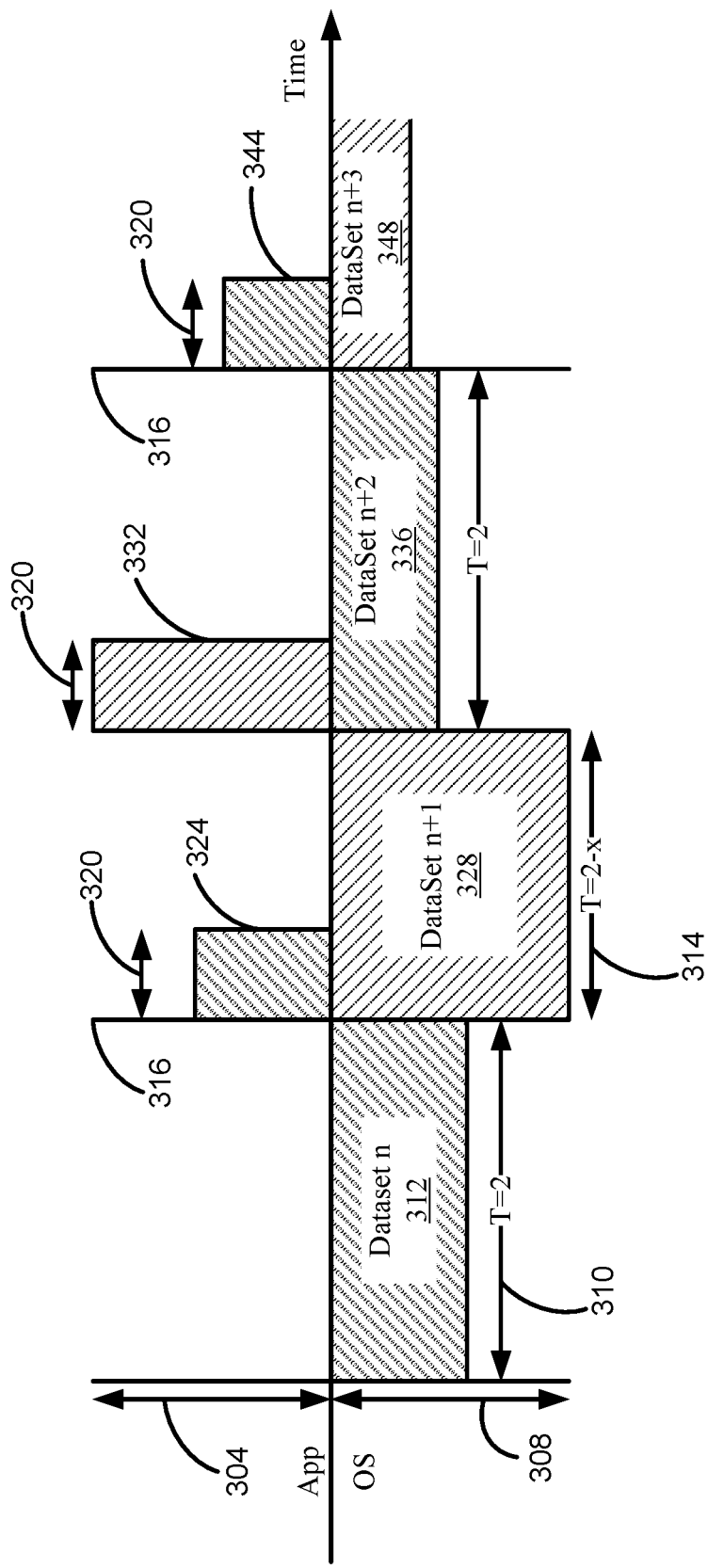

METHOD AND SYSTEM FOR ACCESSING HISTORICAL SENSOR DATA WITHOUT LOCATION SERVICES

CROSS-REFERENCE TO RELATED APPLICATION

This application claims priority to U.S. Provisional Patent Application No. 63/093,704, filed on Oct. 19, 2020, entitled "Method And System For Accessing Historical Sensor Data Without Location Services," and U.S. Provisional Patent Application No. 63/124,675, filed on Dec. 11, 2020, entitled "Method And System For Accessing Historical Sensor Data Without Location Services," the disclosures of which are hereby incorporated by reference in their entirety for all purposes.

BACKGROUND OF THE INVENTION

Modern mobile devices include a number of sensors operable to measure characteristics of an environment of the mobile device. Despite the progress made in the area of using mobile devices to collect and process data, there is a need in the art for improved methods and systems related to collecting and processing sensor data of a mobile device.

SUMMARY OF THE INVENTION

Embodiments of the present invention generally relate to detecting driving data, and more particularly, to detecting driving data while a data collection application is suspended or terminated.

According to an embodiment of the present invention, a method includes receiving a notification and requesting, by a data collection application executing over a time interval, sensor measurements from an operating system of a mobile device. The sensor measurements are collected prior to receiving the notification and before an execution of the data collection application. The method also includes receiving, by the data collection application and from the operating system, a set of sensor measurements and identifying one or more events based on the set of sensor measurements. The one or more events occurred during collection of the set of sensor measurements. The notification can be a push notification received by the mobile device from a server.

According to an embodiment of the present invention, a method for collecting historical sensor measurements is provided. The method includes receiving, by a mobile device, a notification, executing, in response to receiving the notification, a data collection application over a time interval, and requesting, by the data collection application, sensor measurements from an operating system of the mobile device. The sensor measurements are collected prior to receiving the notification and before execution of the data collection application. The method also includes receiving, by the data collection application and from the operating system, a set of sensor measurements and, in some examples, optionally transmitting, by the data collection application, the sensor measurements to a server during the time interval. The data collection application may terminate upon expiration of the time interval.

The method may further include storing the set of sensor measurements within a memory of the mobile device. In some embodiments, the notification is received at regular intervals. Alternatively, or additionally, the notification can be received at dynamic intervals that change over time. In some embodiments, the notification is generated by a local process of the mobile device. Alternatively, or additionally, the notification can be generated by another application of the mobile device. In some embodiments, the notification is received from an operating system of the mobile device. Alternatively, or additionally, the notification can be received from a hardware device. The hardware device may be a component of the mobile device. Alternatively, or additionally, the hardware device may be a device external to the mobile device.

In some embodiments, the notification is generated, at least in part, from motion of the mobile device. Alternatively, or additionally, the notification may be generated, at least in part, from an increase in the likelihood of motion of the mobile device. In some embodiments, a quantity of sensor measurements included in a first subset of the set of sensor measurements is based on a maximum data size that can be transmitted entirely during the time interval. Alternatively, or additionally, the quantity of sensor measurements included in the first subset of the set of sensor measurements can be based on a signal strength of a radio of the mobile device. Defining the first subset of the set of sensor measurements may include downsampling the set of sensor measurements by the mobile device.

In some embodiments, the method further comprises transmitting the one or more events in place of the set of sensor measurements. Alternatively, or additionally, the method may comprise transmitting metadata that characterizes at least one event of the one or more events. In some embodiments, the set of sensor measurements includes activity data. Alternatively, or additionally, the set of sensor measurements may include a quantity of sensor measurements that are capable of being transmitted during the time interval. In some embodiments, a size of the time interval is based on a data size of the set of sensor measurements. The sensor measurements may include measurements from an accelerometer.

According to another embodiment of the present invention, a method for accessing sensor-based driving data is provided. The method includes receiving, by a mobile device, a notification from a sensor of the mobile device. The sensor of the mobile device may not be reliant on location permissions and may generate notifications based on motion of the mobile device that is determined to be a significant motion. The mobile device may execute, in response to receiving the notification, a data collection application. The method also includes receiving, by the data collection application, a first set of sensor measurements from at least one sensor of the mobile device and transmitting, by the data collection application, the first set of sensor measurements to a server.

In some embodiments, the method further comprises storing at least a portion of the first set of sensor measurements within a memory of the mobile device. Alternatively, or additionally, the method may further comprise processing at least a portion of the first set of sensor measurements by the mobile device to detect one or more events that occurred when the first set of sensor measurements were collected.

According to another embodiment of the present invention, a method of obtaining driving data using a mobile device is provided. The method includes receiving a notification. The method also includes executing, on the mobile device and in response to receiving the notification, a data collection application. The method also includes requesting, by the data collection application, sensor measurements stored in a data cache accessible by an operating system of the mobile device. The sensor measurements may have been collected prior to receiving the notification and before execution of the data collection application. The method also includes receiving a set of sensor measurements stored in the data cache and transmitting at least a portion of the set of sensor measurements to a server.

In some embodiments, the notification comprises a push notification received by the mobile device from the server. In some embodiments, the notification may be generated by a background process operating on the mobile device. The data collection application may be executed as a background process. In some embodiments, the method may further comprise instructing the operating system of the mobile device to store additional sensor measurements during a time following receiving the set of sensor measurements.

According to yet another embodiment of the present invention, a system is provided. The system includes one or more processors and a non-transitory computer-readable medium storing instructions, that when executed by the one or more processors, configure the system to receive a notification and execute, in response to receiving the notification, a data collection application over a time interval. The instructions also configure the system to request, by the data collection application, sensor measurements from an operating system of a mobile device, the sensor measurements having been collected prior to receiving the notification and before execution of the data collection application, and receive, by the data collection application and from the operating system, a set of sensor measurements.

In some embodiments, the notification is generated as a result of an indication of motion from a motion sensor of the mobile device. The motion sensor may be a virtual sensor configured to generate the indication of motion based on measurements collected from an accelerometer.

Another aspect of the present disclosure includes a system comprising one or more processors and a non-transitory computer-readable medium storing instructions, which when executed by the one or more processors, cause the one or more processors to perform any of the methods described above.

Another aspect of the present disclosure includes a non-transitory computer-readable medium storing instructions, which when executed by the one or more processors, cause the one or more processors to perform any of the methods described above.

Numerous benefits are achieved by way of the present invention over conventional techniques. For example, embodiments of the present invention can collect sensor measurements associated with a drive without location services (such as global position systems, Wi-Fi, cellular tower triangulation, or any other service provided by the mobile device or an external devices that provides the location of the mobile device) or an active execution of a data collection application. In addition, by avoiding the use of location services, resource consumption (e.g., power, processing, bandwidth, etc.) associated with the continuous collection of sensor data may be reduced without impacting the quality or accuracy of the collected sensor data. In addition, the privacy of the user may be protected by not detecting and/or recording the location of the user throughout a drive. Resource consumption may be reduced further by collecting sensor data using native processes rather than actively executing data collection applications.

Further areas of applicability of the present invention will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures:

FIGS. 3A-3D depict example diagrams for scheduling transmission of historical sensor measurements according to certain embodiments of the present disclosure.

DETAILED DESCRIPTION OF SPECIFIC EMBODIMENTS

Figure 1:
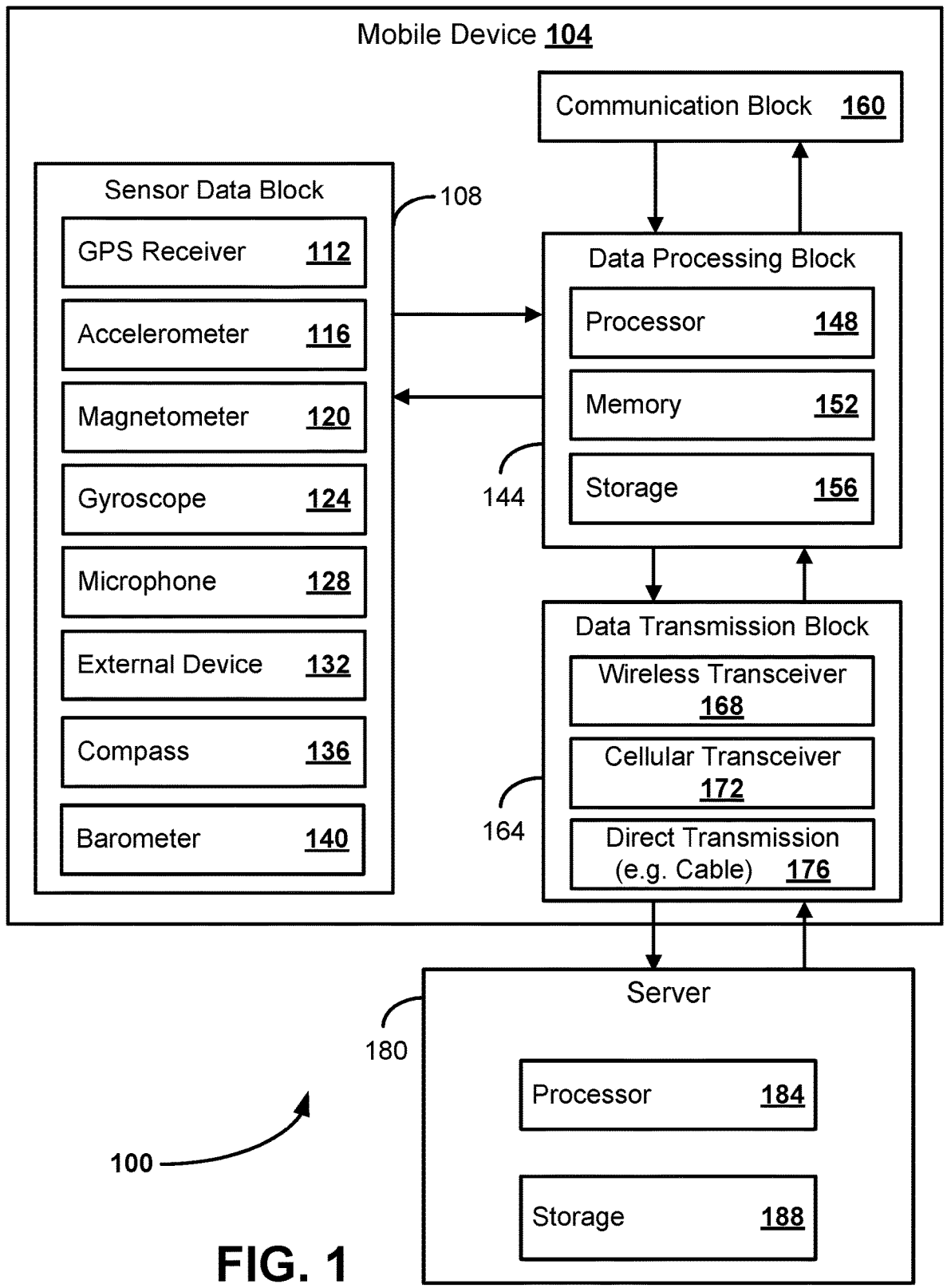
FIG. 1 depicts a system diagram illustrating a system for measuring device acceleration and detecting physical interaction according to some examples.

According to some embodiments of the present invention, methods and systems are provided that enable accessing sensor-based driving data without location services (e.g., a global position system, Wi-Fi, cellular tower triangulation, ultra-wideband device proximity sensors, or any other service provided by the mobile device or a remote device that determines a location of the mobile device). A mobile device may execute a data collection application for collecting sensor measurements. The data collection application may collect sensor measurements from one or more sensors of the mobile device. While executing, the data collection application may consume resources of the mobile device. For instance, the data collection application may consume processing resources (e.g., processor and/or memory), network resources (e.g., receiving/transmitting data), and cause other processes of the mobile device to consume resources (e.g., through operating sensors, sampling rates of the sensors, storage of sensor measurements, etc.). Since other applications and/or the operating system of the mobile device may also collect sensor measurements, the data collection application may request access to the collected sensor measurements. As a result, the data collection application can retain the quantity and accuracy of sensor measurements while reducing the time the data collection application executes.

The mobile device may execute the data collection application in response to detecting one or more events. For example, one event may be detecting that a geofence (e.g., a virtual fence that surrounds the mobile device) has been crossed (indicating that the mobile device may be moving in a vehicle). Detecting that the geofence has been crossed may use one or more sensors of the mobile such as sensors providing location services (e.g., a GPS sensor). GPS sensors may use a significant amount of resources of the mobile device and may only be operable when there is a clear view between the mobile device and the GPS satellites. If the mobile device has good reception with the GPS satellites and is connected to a power source (e.g., the vehicle), then the mobile device may use the GPS sensor to detect if the geofence has been crossed to determine the beginning of a drive.

In other instances, the mobile device may avoid the use of location services to reduce the consumption of the finite energy resources of the mobile device, protect the privacy of the user, and/or maintain data collection operations when location services are disabled (e.g., when the user intentionally or unintentionally disables location services or when another application or the operating system disables location services). According to some examples, when location services are not being used, for instance if location services are disabled on the mobile device, one of several methods can be used to trigger collection of sensor measurements independent of location services. For example, rather than using a geofence to trigger execution of the data collection application, a notification may be used, such as a silent notification received from a server (e.g., a silent push notification) to trigger execution of the data collection application. Since the notification causes the data collection application to execute, sensor measurements may be collected without the use of location services, which, as discussed above, may cause an excessive drain of the power source of the mobile device and privacy concerns for the user. Thus, data collection, processing, and/or transmission of sensor measurements may be performed independent of location services, enabling analysis of user movement, including driving, without the use of location services.

Upon executing, the data collection application may request that the operating system collect sensor measurements for a collection time interval (e.g., such as two hours). The collection time interval can begin when the data collection application transmits the request and may end when the collection time interval expires or upon the subsequent execution of the data collection application. The data collection application may then terminate to avoid excess resource consumption.

The mobile device may receive a subsequent notification that triggers a subsequent execution of the data collection application. Upon executing, the data collection application may request that the operating system collect sensor measurements for a subsequent collection time interval (e.g., such as two hours). The data collection application then requests the sensor measurements collected over the previous collection time interval (e.g., the time between the prior execution of the data collection application and this execution of the data collection application). The data collection application may transmit the collected sensor measurements to a server, then terminate until the next notification is received. Trip detection algorithms running on the server can then process some or all of the collected sensor measurements, metadata based on the collected sensor measurements, or the like, to detect that a trip has occurred.

Alternatively, the data collection application may process the collected sensor measurements on the mobile device to derive characteristics of the drive such as, but not limited to, driver behaviors, driving events (e.g., a collision or the like), vehicle status, indications of distracted driving, combinations thereof, and the like. The data collection application may then store the characteristics, display the characteristics, transmit the characteristics, combinations thereof, or the like. In some examples, the results determined by processing of the collected sensor measurements may be transmitted to a server, utilized internally by the mobile device, for example, in conjunction with communication with the user of the mobile device, stored on the mobile device, discarded, or the like.

The data collection application may continue to obtain the (historical) sensor measurements collected by the operating system without continuously executing the data collection application or using location services. As a result, the mobile device may continue to obtain sensor measurements while substantially reducing the resources consumed by the mobile device.

FIG. 1 is a system diagram illustrating a system 100 for measuring device acceleration and detecting physical interaction according to some examples. System 100 includes a mobile device 104 which includes a plurality of processing, sensor, and communication resource components. Mobile device 104 may include a sensor data block 108, a data processing block 144, a data transmission block 164, and optionally a communication block 160. The sensor data block 108 includes data collection sensors as well as the data collected from sensors that is available to mobile device 104. This can include external devices connected via Bluetooth, universal serial bus (USB) cable, etc. Sensor data block 108 depicts an example set of sensors (e.g., sensors 112-140) that may be included in mobile device 104. However, mobile device 104 may include any number and/or type of additional sensors (not shown) including virtual sensors (e.g., a construct that derives measurements from measurements collected from one or more other sensors). For example, mobile device may include a significant motion sensor that generates an indication that the mobile device is moving based on measurements from one or more other sensors (e.g., such as an accelerometer, a gyroscope, etc.). The data processing block 144 may include storage 156 which may include data from the sensors of the sensor data block 108 processed by processor 148, which may be implemented in the form of multiple local or distributed processors providing the processing functionality described herein. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may include wireless transceiver 168, cellular transceiver 172, or direct transmission 176. Data transmission block 164 may process communications (e.g., transmitted and received communications) such as the processed sensor data transmitted to an external computing device (e.g., server 180). The external computing device may also store and/or process the data obtained from sensor data block 108. Server 180 may include its own processor 184 and storage 188.

Communication block 160 may transmit communications between the processor and applications executed by mobile device 104, between applications executed by mobile device 104 (e.g., inter-process communication), and report the results of analysis of sensor data performed by the data processing block 144 to a user of the mobile device 104 via a display (not shown). In some examples, the analysis of collected sensor measurements may be performed by a process executed by processor 148 of mobile device 104

(e.g., locally on mobile device 104). In other examples, the collected sensor measurements may be transmitted to server 180 for processing, as described further herein with respect to FIG. 9. For example, communication block 160 may display or otherwise present a warning communication to a user of the mobile device 104 upon determining that that the user may be a distracted driver.

Some examples are described using examples where driving data is collected using mobile device 104, and these examples are not limited to any particular mobile device. As examples, a variety of electronic devices including sensors such as location determination systems such as global positioning system (GPS) receivers 112, accelerometers 116, magnetometers 120, gyroscopes 124, microphones 128, external (sensor) devices 132, compasses 136, barometers 140, communications capabilities, and the like may be included or connected to mobile device 104. Exemplary mobile devices include smart watches, fitness monitors, Bluetooth headsets, tablets, laptop computers, smart phones, music players, movement analysis devices, and the like.

In some examples, settings of a mobile device may be used to enable different functions described herein. For example, an operating system (OS), such as Apple iOS, Android OS, and/or wearable device operating systems having certain settings enabled can enable certain functions of examples. In some examples, having location services enabled allows the collection of location information from the mobile device (e.g., collected by global positioning system (GPS) receiver 112), and enabling background app refresh allows some examples to execute in the background, collecting and analyzing driving data even when the application is not executing. In some instances, location information may be determined by other sensors of the mobile device such as by tracking movement of the mobile device (e.g., using an accelerometer), by receiving location information from an external source, for example, radio triangulation (e.g., using cellular or Wi-Fi radios), by an Internet Protocol (IP) address of the mobile device, or by other means.

Figure 2:
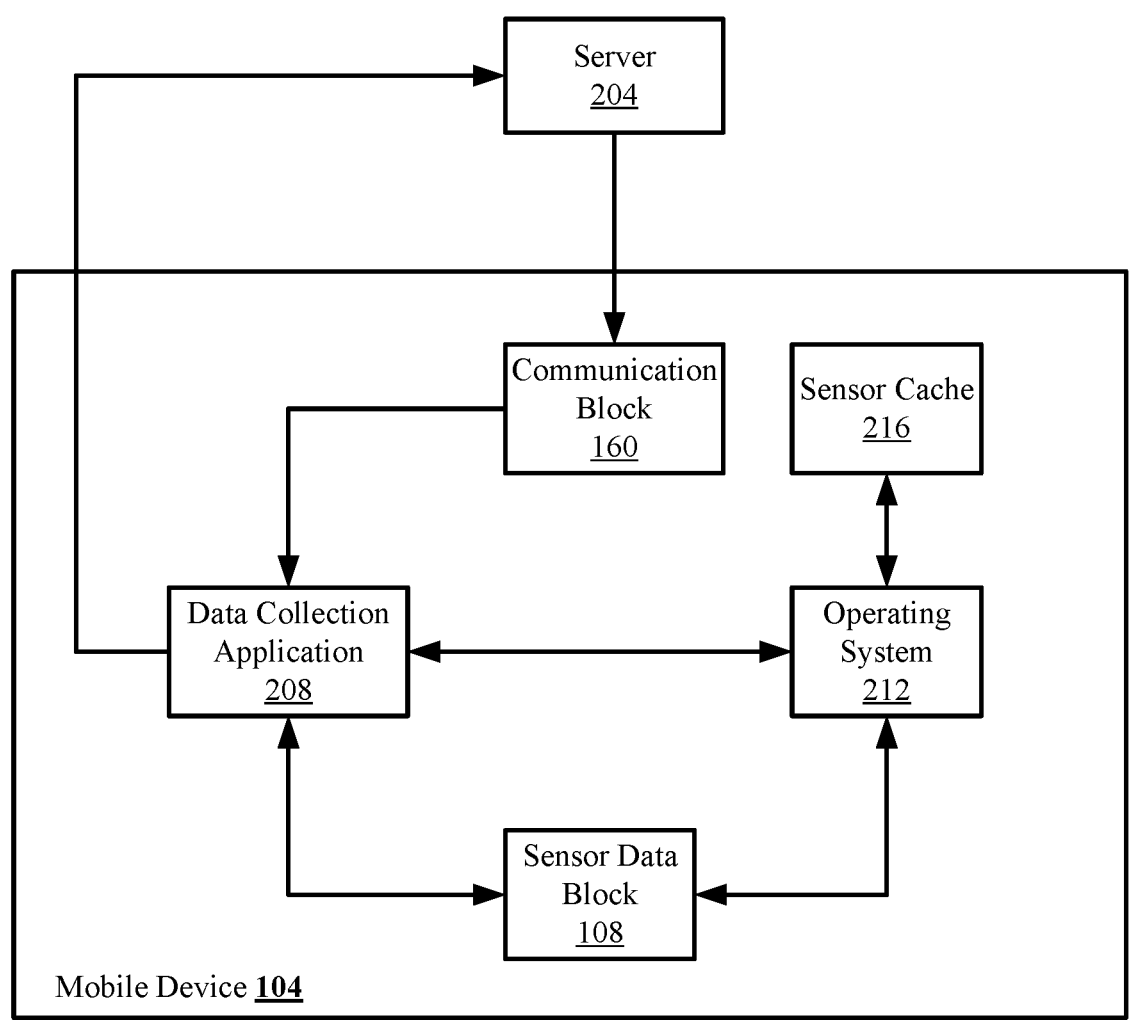
FIG. 2 depicts an example block diagram of the collection and transmission of historical sensor measurements according to certain embodiments of the present disclosure.

FIG. 2 depicts an example block diagram 200 of the collection and transmission of historical sensor measurements according to certain embodiments of the present disclosure. Sensor measurements from sensors of the mobile device (e.g., sensors of sensor data block 108) may be stored by a data collection application 208 while the data collection application is executing on mobile device 104. When data collection application 208 is not executing, data collection application 208 may not be able to store sensor measurements. The data collection application 208 may obtain sensor measurements collected and/or stored by other applications and/or the operating system 212 of the mobile device 104.

For example, other applications and/or the operating system of the mobile device may collect and store sensor measurements over a predetermined time interval. In some instances, the mobile device may receive a request from other applications and/or the operating system, to store sensor measurements from particular sensors. The other applications and/or the operating system may then store sensor measurements from the particular sensors over the predetermined time interval. The data collection application, upon executing, may request the sensor measurements collected or stored by the other applications and/or the operating system of the mobile device.

Mobile device 104 may receive communications from server 204. Server 204 may store a schedule over which sensor measurements are to be collected, stored, and/or transmitted to server 204 (or another remote device). The schedule may indicate that the sensor measurements are to be collected, stored, and/or transmitted in regulator intervals, upon detecting an event (e.g., detecting a particular quantity of sensor measurements that is greater than a threshold, detecting an aggregate data size of sensor measurements that is greater than a threshold, detecting a vehicle collision, detecting sensor measurements with values that are greater than a threshold, detecting a notification, or the like), receiving user input, combinations thereof, and the like. The schedule may be defined by mobile device 104 (e.g., by a user of the mobile device or by the data collection application) or by server 204.

Server 204 may transmit a communication that is addressed to (in this example) data collection application 208 of mobile device 104 according to the schedule. The communication (e.g., push notification, silent push notification, or the like) may be received by communication block 160 of mobile device 104 illustrated in FIG. 1. Communication block 160 parses the communication to identify the address (e.g., destination application or process) from the payload. Communication block 160 then routes the communication to the addressed application or process (e.g., data collection application 208).

Data collection application 208 may be an application that is periodically executed by mobile device 104 to collect sensor measurements using sensors of sensor data block 108. If data collection application 208 is executing, the communication may direct the data collection application 208 to perform one or more actions (e.g., collect sensor measurements from particular sensors, change a sampling rate of a sensor from which sensor measurements are being collected, stop collecting sensor measurements from particular sensors, transmit a predetermined quantity or time interval of sensor measurements, combinations thereof, and the like). Data collection application 208 may then perform the one or more actions based on the notification.

If data collection application 208 is not executing, the communication may cause data collection application 208 to execute. Since data collection application 208 was not executing before the communication was received, data collection application 208 may not have collected sensor measurements requested by the communication. Upon execution, data collection application 208 may transmit a request to operating system 212 to collect sensor measurements for particular sensors over a subsequent time interval (e.g., the next 12 hours) that may start when the request is received by operating system 212. The next time data collection application 208 executes (e.g., at a subsequent time), data collection application 208 may request the sensor measurements collected over the time interval (e.g., the time between when the request is received by operating system 212 and the execution of data collection application 208 at the subsequent time provided the subsequent time is within the subsequent time interval). Data collection application 208 may also transmit a request to operating system 212 for sensor measurements collected before data collection application 208 was executed. For example, data collection application 208 may obtain historical sensor measurements collected during a preceding time interval in which data collection application 208 had previously requested the collection of sensor measurements. The preceding time interval may begin at a time in which the data collection application 208 last executed and end at the time corresponding to this current execution of data collection application 208.

Sensor cache 216 includes a memory that stores sensor measurements collected by operating system 212 on behalf of the various applications of mobile device 104. Sensor cache 216 may include volatile and/or non-volatile memory. Sensor cache 216 may store sensor measurements requested by other applications in addition to data collection application 208. In some instances, operating system 212 may identify the portion of the sensor measurements stored in sensor cache 216 that were collected on behalf of the requesting application. In those instances, data collection application 208 may only obtain sensor measurements that correspond to the request made by data collection application 208.

In other instances, operating system 212 may identify some or all of the sensor measurements in sensor cache 216 that were collected within the preceding time interval, regardless of the application that requested the sensor measurements. For example, other applications and/or the operating system may collect sensor measurements from various sensors (e.g., of sensor data block 108 or other sensors) of mobile device 104. Sensor cache 216 may include collected sensor measurements in addition to those measurements collected as a result of a request by data collection application 208. Data collection application 208 may request only those sensor measurements collected as a result of the request by data collection application 208. Alternatively, data collection application 208 may request any sensor measurements collected during the preceding time interval, which may include additional sensor measurements collected from other sensors than the sensors requested by data collection application 208. For instance, data collection application may request accelerometer measurements at a first sampling rate and another application may request accelerometer measurements at a second (e.g., a higher) sampling rate. Data collection application 208 may obtain the sensor measurements collected at the first sampling rate and/or the sensor measurements collected at the second sampling rate. In another instance, data collection application 208 may request accelerometer measurements and another application may request gyroscopic measurements. Data collection application 208 may request just the accelerometer measurements that were originally requested or both the accelerometer measurements and the gyroscopic measurements. Examples of the present invention may request a subset of the data available in the sensor cache 216, for example, only acceleration data and activity data. In other examples, all of the data available in the sensor cache 216 can be requested and thereby made available for data processing or transmission to a server as described herein. One of ordinary skill in the art would recognize many variations, modifications, and alternatives.

In some instances, data collection application 208 may request sensor measurements collected by operating system 212 without having requested operating system 212 to collect the sensor measurements. For example, the first time data collection application 208 executes (or the first time after a long time interval), data collection application 208 may request that sensor measurements be collected by operating system 212. However, since this is the first time data collection application 208 is executing, there may not have been a previous execution of data collection application 208 in which a previous request was made to collect sensor measurements within the preceding time interval. In other words, at this time, sensor cache 216 may not include sensor measurements collected as a result of a request by the data collection application.

Other applications of mobile device 104 may have requested that operating system 212 collect sensor measurements in sensor cache 216. Data collection application 208 may thus request sensor measurements collected over a preceding time interval (e.g., that begins at some time prior to the execution of data collection application and ends at the time data collection application executes). The request may include an identification of the preceding time interval, a sensor type, a sampling rate, a data size of sensor measurements requested, a quantity of sensor measurements requested, and/or the like. Operating system 212 may then determine if any sensor measurements are stored in sensor cache 216 that satisfy the criteria specified by data collection application 208. If there are sensor measurements that meet the criteria specified by data collection application 208, operating system 212 transmits the sensor measurements to data collection application 208. If there are no sensor measurements that meet the criteria specified by data collection application 208, operating system may return a null response, an empty response, or no response at all.

Once data collection application 208 receives the requested sensor measurements collected over the preceding time interval, data collection application 208 may store the sensor measurements in local memory. Local memory may be non-volatile memory that may store a larger quantity of data for a longer time period than sensor cache 216 enabling data collection application 208 to retain the requested sensor measurements for longer time period (as sensor cache 216 may only retain a certain quantity of data or data collected over a preceding time). Alternatively or additionally, data collection application 208 may transmit the sensor measurements to server 204. Once the sensor measurements are stored (and/or transmitted to server 204), data collection application may terminate. Since data collection application 208 requested that operating system 212 collect sensor measurements over the next time interval, operating system 212 may continue to collect sensor measurements while data collection application 208 is not executing. The next time data collection application 208 executes (e.g., when the next communication is received from server 204), data collection application 208 may once again request that operating system 212 collect sensor measurements for a subsequent time interval and request the sensor measurements collected over the next time interval.

FIGS. 3A-3D depict example diagrams for scheduling transmission of historical sensor measurements according to certain embodiments of the present disclosure. Resource consumption of the mobile device may be reduced by reducing the number of processes executed by the mobile device. In some instances, sensor measurement collection may be performed by the operating system in addition to or in place of the data collection application. In those instances, the data collection application may execute periodically (rather than continuously) by using the operating system to collect measurements and the data collection application to manage the collected sensor measurements and transmit the collected sensor measurements to a server.

Each time the data collection application executes, the data collection application may transmit a new request to the operating system to collect sensor measurements for a subsequent time interval. The data collection application may then transmit sensor measurements collected over the preceding time interval (e.g., prior to execution of the data collection application). The data collection application may then terminate to reduce the number of active processes and the resource consumption of the mobile device.

The mobile device, data collection application, and/or server may establish a schedule by which the data collection application is to execute and transmit collected sensor measurements. The schedule may indicate a time and/or frequency in which the data collection application is to execute and transmit collected sensor measurements. Alternatively or additionally, the schedule may indicate conditions (e.g., such as an occurrence of an event) that may trigger the data collection application to execute and transmit collected sensor measurements.

Figure 3A:
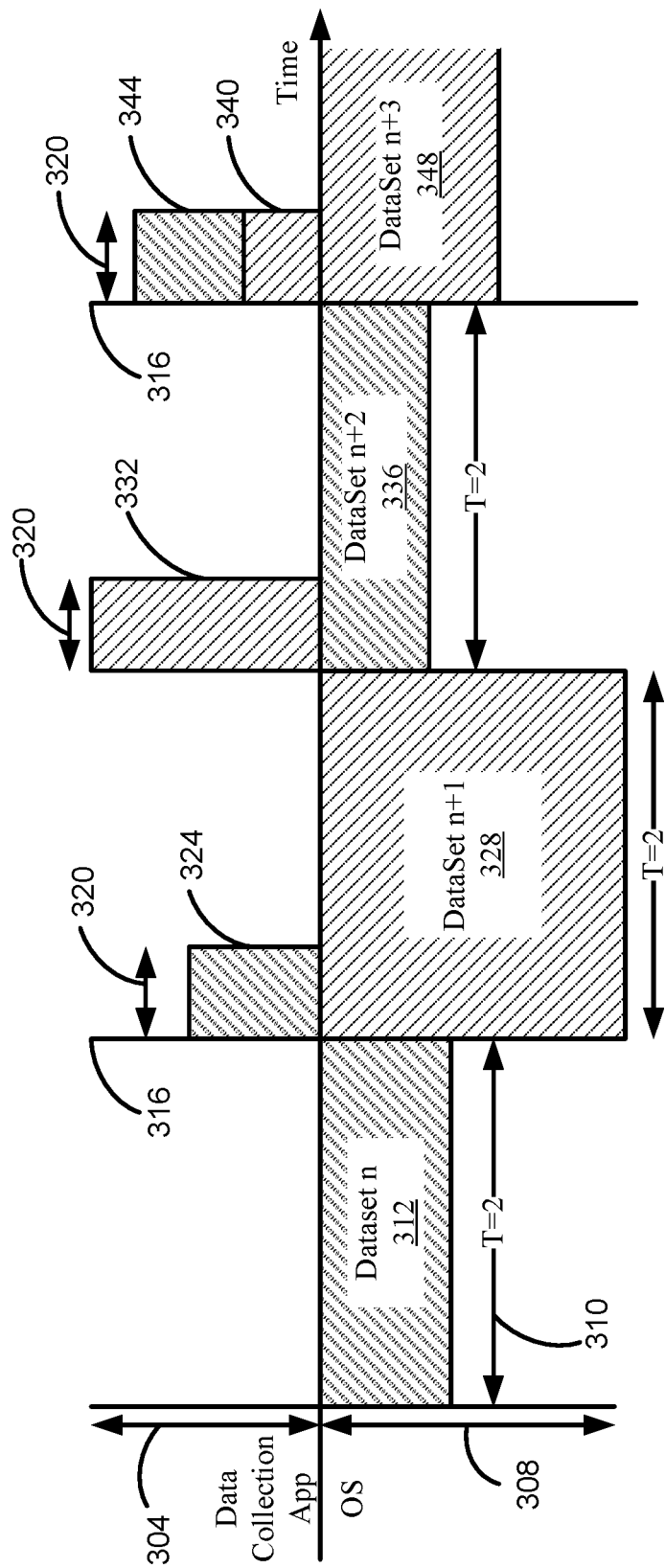

FIG. 3A depicts a first example diagram for scheduling transmission of historical sensor measurements. Since the data collection application may execute for limited time intervals (e.g., over an execution time interval 320), the data collection application may be limited to a data limit 304 that can be transmitted to the server. An operating system of the mobile device may be configured to collect up to a threshold quantity of sensor measurements 308 during collection time interval 310 (which may be equal to the time interval between the beginning 316 of each execution time interval. The predetermined time interval may be based on a request to the operating system to collect sensor measurements or on a predetermined threshold of data size or data volume of the sensor measurements. In this example, the collection time interval 310 is a fixed time interval that is equal to two hours.

A server may transmit a communication (e.g., such as a silent notification, or the like) to the mobile device that causes the mobile device to execute a data collection application. The notification may be received in regular intervals that is equal to the collection time interval length (e.g., every two hours). Upon receiving the first communication, the data collection application executes and transmits a request to the operating system to begin collecting sensor measurements in a sensor cache. The request can include a collection time interval over which sensor measurements are to be collected, one or more sensor types to collect sensor measurements from, and/or the like. Since this is the first time the data collection application executes, there are no previously collected sensor measurements for the data collection application to obtain from the operating system. After transmitting the request, the data collection terminates.

The operating system begins collecting sensor measurements in dataset n 312 over the collection time interval while data collection application is terminated. Upon receiving the next communication, the data collection application executes again over an execution time interval 320. The data collection application transmits a new request to the operating system to collect sensor measurements over the next collection time interval. The data collection application then begins transmission 324, which includes the sensor measurements of dataset n 312 collected over the previous collection time interval. The operating system continues to collect sensor measurements in response to the new request. The data collection application may transmit dataset n 312 to the server in parallel with the operating system's collection of the new set of sensor measurements: dataset n+1 328.

Since the data collection application may execute over a limited execution time interval 320, the transmission 324 may include as much of dataset n 312 as can be transmitted over the execution time interval. Once the execution time interval terminates, the data collection application terminates. Since the data size of dataset n 312 is less than the data limit 304, the data collection application is able to transmit the entire dataset n 312 during the executing time interval 320. The data collection application then terminates again until the next communication is received from the server.

Upon receiving the next communication, the data collection application requests sensor measurements over the next time interval (e.g., dataset n+2 336). The data collection application initiates transmission 332, which includes the dataset n+1 328 collected over the previous collection time interval. Dataset n+1 328 may include more data than can be transmitted during the limited execution time interval 320. The transmission 332 may include a portion of dataset n+1 328, which corresponds to the quantity of dataset n+1 328 that can be transmitted during the execution time interval 320. In some instances, the data collection application may include the oldest sensor measurements of dataset n+1 328 in transmission 332. In other instances, the data collection application may include the most recently collected sensor measurements of dataset n+1 328 in transmission 332. If the data collection application cannot transmit the entire dataset n+1 328, the data collection application may store an indication as to the last sensor measurement of dataset n+1 328 that was transmitted to enable transmission of the remaining portion of dataset n+1 328 during the next execution time interval.

Upon receiving the next communication, the data collection application requests collection of sensor measurements over the next time interval (e.g., resulting dataset n+3 348). The data collection application then initiates transmission 340 and transmission 344. Since the data collection application could not transmit all of dataset n+1 328, the data collection application may initiate a first transmission 340 that includes the remaining portion of dataset n+1 328 then a second transmission 344 that includes dataset n+2 336 (e.g., the new set). Alternatively, the data collection application may initiate the second transmission 344 first followed by the first transmission 340 (e.g., which includes the remaining portion of dataset n+1 328). Once the execution time interval 320 expires, the data collection application terminates until the next communication is received.

As shown, the first transmission 340 and the second transmission 344 are able to be completed with the execution time interval 320. However, if the first transmission 340 and the second transmission 344 cannot be transmitted within the execution time interval, the data collection application may transmit as much of the first transmission 340 and the second transmission 344 (e.g., starting with the first transmission 340) as is possible and transmit the remaining portion of the transmission(s) in a subsequent execution time interval.

FIG. 3B depicts a second example diagram for scheduling transmission of historical sensor measurements. In this example, the execution frequency of the data collection application may be dynamically adjusted based on the state of the sensor measurement collection. If the data collection application and/or the server determines that the operating system may collect more sensor data over the collection time interval 310 than can be transmitted over the execution time interval 320, the data collection application and/or the server may dynamically alter the collection time interval, which may cause the data size of each dataset to be set to the data limit 304 that can be transmitted over the execution time interval 320. For example, based on previously transmitted sensor measurements being larger or smaller than a threshold, the data collection application and/or the server may decrease or increase the collection time interval.

For example, operating system collects dataset n 312 during a first collection time interval. This collection time interval may be of the default length of time (e.g., two hours) set by the data collection application or the server. At the end of the collection time interval, the mobile device receives a communication that causes the data collection application to execute. Data collection application may request that the operating system continue to collect sensor measurements and initiates transmission 324 to transmit the previous dataset (e.g., dataset n 312).

During the next collection time interval 314, the operating system may collect sensor measurements until the data size of the next data set (e.g., dataset n+1 328) is equal to the data limit 304. The data collection application may then be executed early (e.g., at two hours minus some time x that occurs when dataset n+1 reaches the data limit 304), enabling the data collection application to initiate transmission 332 to transmit the previous dataset (e.g., dataset n 312). The operating system may execute the data collection application when the size of dataset n+1 328 is equal to data limit 304 to enable the entirety of dataset n+1 328 to be transmitted during transmission 332. The data collection application may then terminate. The subsequent collection time interval may revert to the default length of two hours (unless the dataset collected during that time interval is greater than or equal to the data limit 304). The data collection application may be executed each time a dataset reaches a size that is equal to the data limit 304.

Dynamic scheduling may be defined by the data collection application or the server. In some instances, the data collection application or the server may cause the operating system to monitor the data size of sensor measurements collected by the operating system for the data collection application. When the operating system detects that data size reaches a threshold (e.g., data limit 304), the operating system can execute the data collection application. In other instances, the server may determine, based on sensor measurements collected by the operating system over a previous time interval, the sampling rate of sensors, the expected length of a current drive, combinations thereof, and the like, that the data size of the dataset collected during the next collection time interval will exceed the data limit 304. The server may then transmit the next communication at a time in which it is estimated that the size of the dataset is equal to or less than the data limit 304.

Figure 3C:
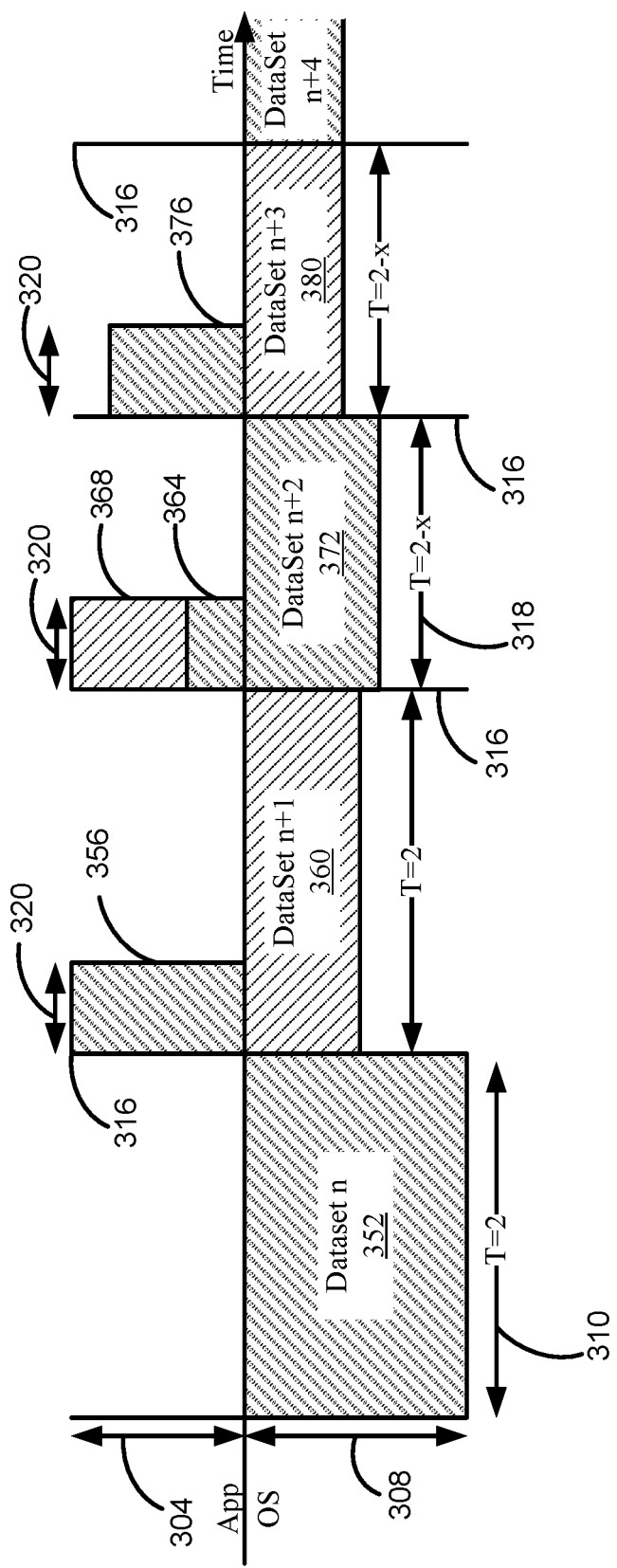

FIG. 3C depicts a third example diagram for scheduling transmission of historical sensor measurements. In this example, the collection time interval 310 may be dynamically adjusted based on data size of previously collected datasets. If the data collection application determines that a dataset cannot be entirely transmitted during an execution time interval, the data collection application may transmit a communication to the server (e.g., with the dataset) to cause server to increase the frequency with which the server transmits communications that cause the execution of the data collection application. Alternatively, the server may, upon inspection of received datasets, increase the frequency with which communications that cause the execution of the data collection application are transmitted. The frequency may reduce the collection time interval 310, which may reduce the size of subsequent datasets such that the subsequent datasets may be transmitted within the execution time interval (e.g., the size may be reduced to the data limit 304). For example, during a long distance drive, the mobile device may collect a greater quantity of sensor measurements during each collection time interval, which may be greater than the data limit 304. The data collection application and/or the server can then cause an increase in the frequency of communications, which may decrease the collection time interval and the data size of each dataset.

A communication may be received that causes the data collection application to execute. The data collection application may request that the operating system continue collecting sensor measurements, then initiate transmission 356 of the previous dataset (e.g., dataset n 352). Since dataset n 352 includes more data than the data limit 304, transmission 356 may only include a portion of dataset n 352. The data collection application may then terminate. When the next communication is received, the data collection application may initiate two transmissions, the first transmission 364 may correspond to the portion of dataset n 352 that could not be included into transmission 356 and the second transmission 368 may correspond to the next dataset (e.g., dataset n+1 360). The data collection application may then terminate.

It may be determined, as a result of transmitting two transmissions during an execution time interval, that the execution time interval may be too small to transmit the volume of data collected by the operating system. As a result, the frequency with which subsequent communications (that cause the execution of the data collection application) are transmitted may be increased. This may have the effect of decreasing the collection time interval 310 to a reduced collection time interval 318 (e.g., two hours minus some value x). Subsequent collection time intervals may remain at the reduced length until it is determined that the size of subsequent datasets collected during the reduced length is smaller than the data limit 304. This may indicate that the data size of future datasets over the full collection time interval may be less than or equal to the data limit 304. Other factors may be used to determine the frequency of communications that may be transmitted such as, but limited to, quantity of sensor measurements in the dataset, length of the drive, data size of the dataset, user input, GPS measurements, a selected route, or the like.

For example, if it is determined that a mobile device is in a vehicle during a long distance drive (e.g., per a route selection by a user, volume of sensor measurements collected, user input, etc.), the server (or the data collection application) may expect a larger data size (e.g., amount of data) for each dataset. The server (or the data collection application) may increase the frequency of communications (which increases the frequency of transmissions) to decrease the collection time interval such that the data size of the sensor measurements collected during the decreased collection time interval is equal to or less than the data limit 304 and could be transmitted within the execution time interval.

If it is determined that a mobile device is not on a long-distance drive, the server (or the data collection application) may expect a smaller data size for each dataset. The server (or the data collection application) may decrease the frequency of communications (which decreases the frequency of transmissions) to increase the collection time interval provided that the data size of the sensor measurements collected during the increased collection time interval continues to be less than or equal to the data limit 304. In some instances, the server may include an upper communication frequency limit (e.g., the server may not increase the frequency higher than the upper communication frequency limit), a lower communication frequency limit (e.g., the server may not decrease the frequency below the lower communication frequency limit), and/or a default communication frequency (e.g., the communication frequency that causes the collection time interval to be equal to the collection time interval 310 or another communication frequency set by the server, user input, the mobile device, or the like).

In some instances, the data collection application may determine that the frequency that the data collection application executes should be increased (and the collection time interval be reduced). The data collection application may transmit an indication that the communication frequency be increased within one or more of the multiple transmissions that are transmitted during a single execution time interval (e.g., the first transmission 364 and/or the second transmission 368). In other instances, the server, upon receiving two transmissions over an execution time interval, may increase the frequency that subsequent communications (that cause the data collection application to execute) are transmitted to the mobile device.

The next communication may be received early (e.g., at the reduced collection time interval 318). The communication may cause the data collection application to execute, request that the operating system continue to collect sensor measurements (e.g., resulting in dataset n+3 380), initiate transmission 376 of the previous dataset (e.g., dataset n+2 327), and terminate at the end of the execution time interval.

Figure 3D:
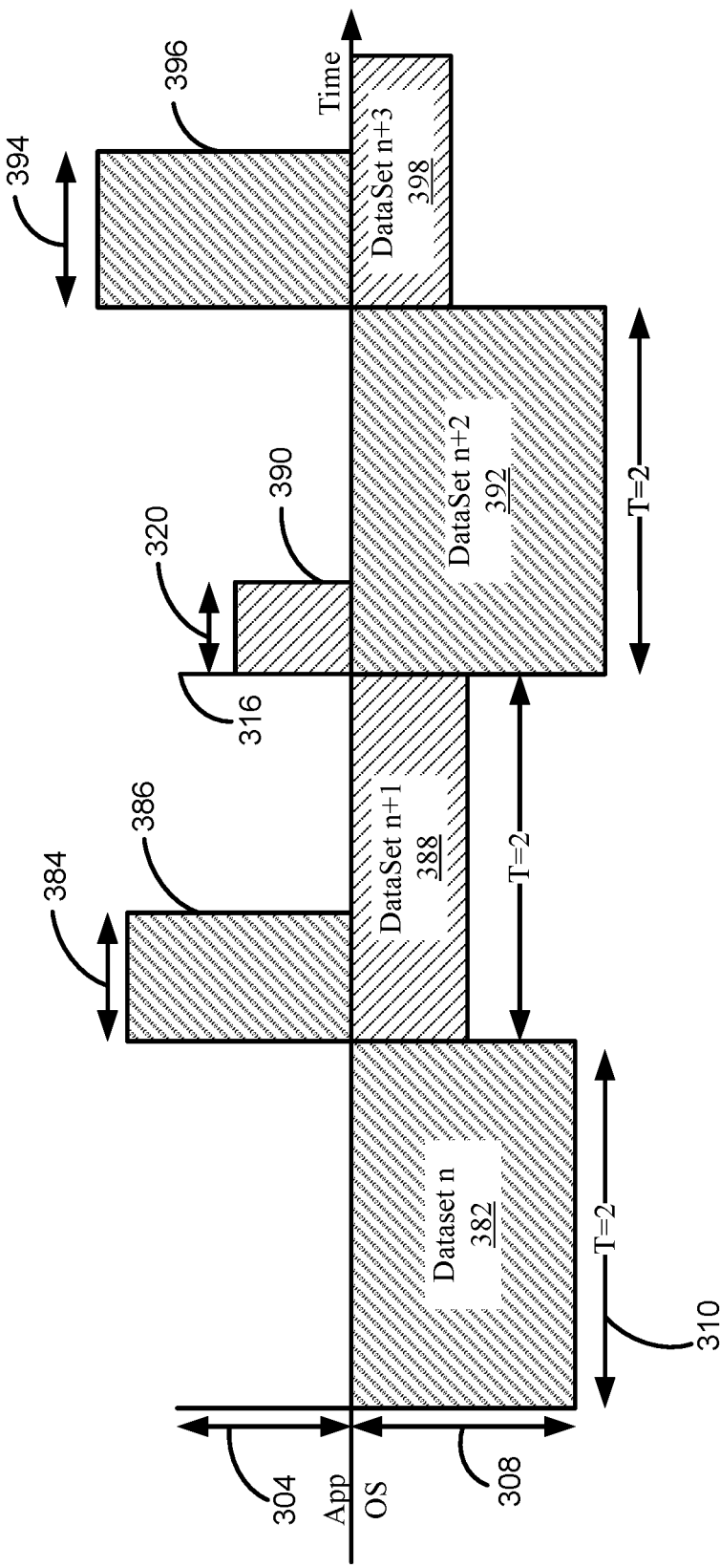

FIG. 3D depicts a fourth example diagram for scheduling transmission of historical sensor measurements. In this example, the execution time interval may be dynamically adjusted based on the data size of each dataset to enable the data collection application to transmit the entire dataset during each execution time interval. In some instances, the execution time interval may be set by the operating system based on the type of communication that causes the execution of the data collection application. For instance, a silent push notification can be transmitted to the mobile device, for example, from a server. When received, the silent push notification is not presented to a user of the mobile device. Instead, the silent push notification may cause the mobile device to execute the data collection application in a background process. The operating system of the mobile device may limit how long the data collection application may execute (e.g., execution time interval 320) in the background process. In some instances, the data collection application may request that the execution time interval be increased. The data collection application may transmit one request that affects each subsequent execution time interval or may transmit a new request that only affects the current (or subsequent) execution time interval.

For example, dataset n 382 may be greater than the data limit 304. When the next communication is received that triggers execution of the data collection application, the data collection application may detect that the dataset n 382 may be too large to transmit over the execution time interval. The data collection application may request from the operating system that the execution time interval 384 be increased to accommodate transmission 386. During the next collection time interval, the dataset n+1 388 may be less than the data limit 304 for transmission 390. When the next communication is received the data collection application may execute and detect that no increase in the execution time interval is needed. Execution time interval may remain the default length (e.g., execution time interval 320).

The next communication causes the data collection application to execute, and again detect that the previously collected dataset (e.g., dataset n+2 392) is larger than data limit 304. The data collection application may request that the execution time interval 394 be increased to accommodate transmission 396. During the next collection time interval, the dataset n+3 398 may be than the data limit 304. The subsequent execution time interval may return to the default length (e.g., execution time interval 320).

The execution time interval may include a default length (e.g., execution time interval 320) that may be increased (e.g., execution time interval 384, execution time interval 394) or decreased (not shown) based on the size of the previously collected dataset. The amount that execution time interval may be increased or decreased may be based on a data size of the dataset to be transmitted, a signal quality of a radio of the mobile device, network bandwidth of the mobile device, signal-to-noise ratio (e.g., that may indicate a clear signal or a signal likely to result in dropped data packets), combinations thereof, and the like.

The examples of FIGS. 3A-3D including transmitting remaining portions of datasets during subsequent execution time intervals (e.g. FIG. 3A), decreasing the length of collection time interval when the data size of the dataset collected during the time interval is greater than or equal to the data limit 304 (e.g., FIG. 3B), increasing the frequency of communications that cause the data collection application to execute (which increases the frequency of transmissions and decreases the length of the collection time interval) (e.g., FIG. 3C), and increasing the execution time interval to transmit larger datasets (e.g., FIG. 3D) may be combined with other examples forming any combination. For instance, the frequency of communications that cause the data collection application to execute may be increased along with increasing the execution time interval. Any combination of the examples of FIGS. 3A-3D may be formed to provide a dynamic schedule for the execution of the data collection application, transmission of previously collected (e.g., historical) sensor measurements, and the termination of the data collection application.

In some instances, the mobile device may process the sensor measurements to reduce the data to be transmitted. For instance, the mobile device may process the sensor measurements to derive events that occurred while the vehicle was in operation. Examples of events can include, but are not limited to, speeding, distracted driving, a collision, hard braking, swerving, departing the road, aggressive driving (e.g., frequent lane changes or changes in speed), and the like. The mobile device may also derive metadata that characterizes the events or other aspects of the time in which the vehicle was in operation such as a timestamp of each event, other characteristics of the vehicle at the time, etc. The mobile device may then transmit the events and/or metadata during the execution time interval instead of transmitting the collected sensor measurements, which may substantially reduce the volume of data that will be transmitted. For instance, if one event occurred, then the mobile device may transmit an indication of the one event and/or the metadata rather than all of the sensor measurements that were collected before the execution time interval. Alternatively, the mobile device may not transmit the sensor measurements and instead use the execution time interval to process the sensor measurements (e.g., to derive characteristics of the drive, events, and/or metadata). The mobile device may then store the processed sensor measurements for later use (e.g., display, other processes, further analysis, transmission, etc.)

Figure 4:
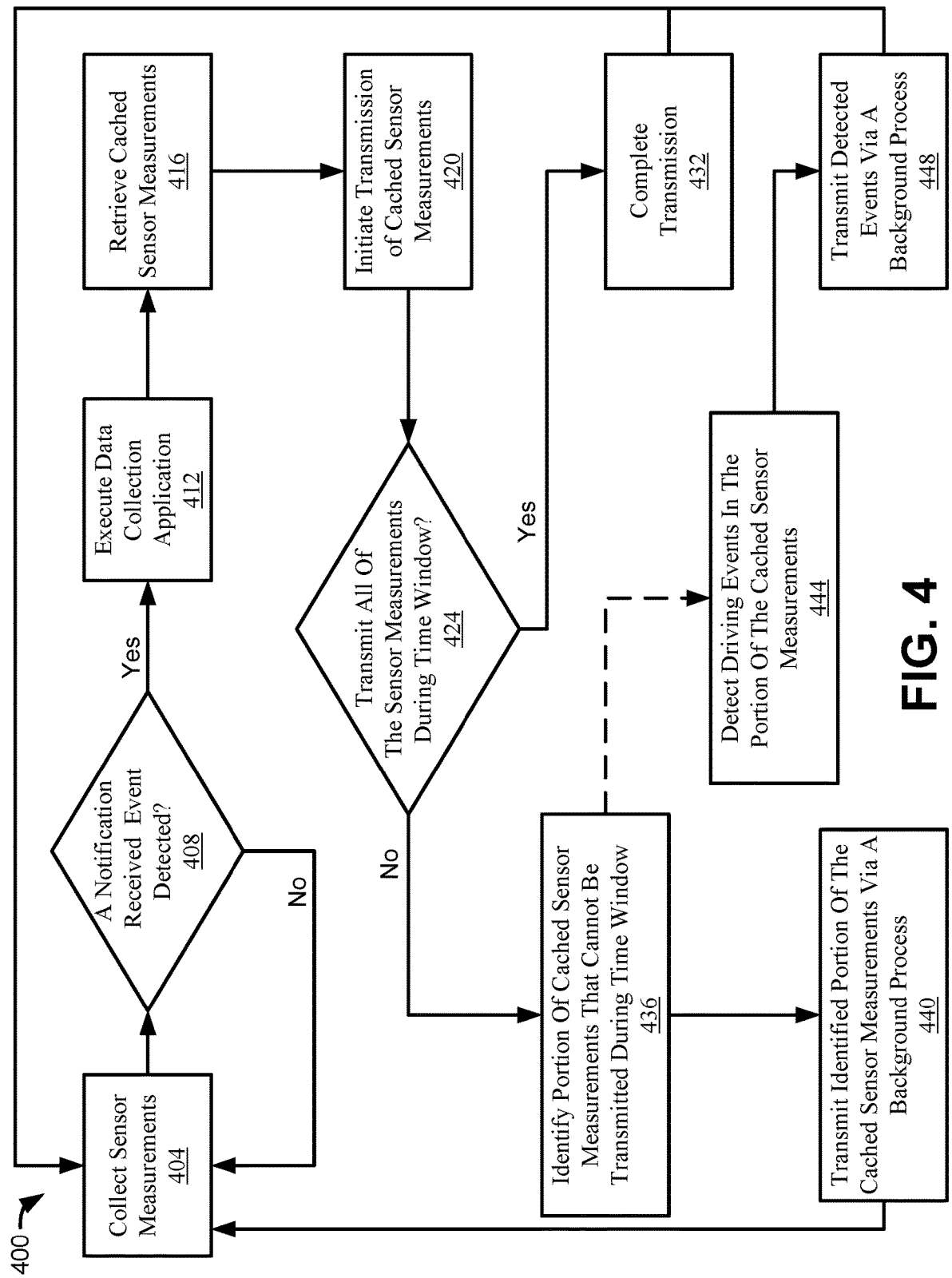
FIG. 4 depicts a flow chart of an exemplary process for transmitting historical sensor measurements through a background process according to certain embodiments of the present disclosure.

FIG. 4 depicts a flow chart of an exemplary process 400 for transmitting historical sensor measurements through a background process according to certain embodiments of the present disclosure. At block 404, sensor measurements are collected. The sensor measurements may be collected by an operating system of a mobile device while the mobile device is positioned within a vehicle during a drive (e.g., also referred to herein as a drive). The operating system may be collecting the sensor measurements as a result of receiving a previous request from a data collection application to collect and store the sensor measurements.

At block 408, a notification received event is detected. The notification may be a silent push notification. Silent push notifications may not be displayed to a user of the mobile device. Instead, silent push notifications may cause the operating system to perform an action associated with an application addressed by the silent push notification in a background process. The action may be, for example, to execute the application, request updates for the application, download data for the application, upload data, combinations thereof, and the like. If, at block 408, the notification is not detected, then the process returns to block 404 where the operating system continues to collect sensor measurements. If the notification is detected, then the process continues to block 412.

At block 412, a data collection application is executed. In some embodiments, the mobile device executes the data collection application in response to receiving the notification. The operating system may limit the duration of execution of the data collection application to a time window (also known as the execution time interval) based on the type of notification received. For instance, the operating system may limit how long the data collection application can execute if the data collection application is executed in response to receiving a silent push notification. The mobile device may use the operating system, which is already continuously executing, to collect sensor measurements on behalf of the data collection application. The data collection application may execute periodically (rather than continuously) to save resources of the mobile device. The operating system may continuously collect sensor measurements, while the data collection application periodically executes to cause the continued collection of sensor measurements and to transmit previously collected sensor measurements to a server device. In some instances, when the data collection application periodically executes, the data collection application may process the collected sensor measurements (e.g., deriving characteristics of the time in which the vehicle is in operation, identifying events, driving behaviors, metadata, etc.) rather than transmit the collected sensor measurements. In those instances, the data collection application may store the processed sensor measurements or transmit the processed sensor measurements.

At block 416, cached sensor measurements are retrieved. In some embodiments, the data collection application retrieves cached sensor measurements collected prior to the execution of the data collection application. For example, the operating system may, upon request, collect sensor measurement over a time interval. As another example, the operating system may automatically collect sensor measurements and store them in a buffer, such as a ring buffer. At the end of the time interval (or at any time prior to the end of the time interval), the data collection application may execute to retrieve the sensor measurements collected prior to execution of the data collection application. This collection may occur in response to receiving a previous notification.

At block 420, transmission of the cached sensor measurements is initiated. In some embodiments, the data collection application initiates transmission of the cached sensor measurements. The cached sensor measurements may be transmitted to a remote device such as a server.

At block 424, it is determined whether the entire cached sensor measurements can be transmitted during the time window. The mobile device may determine a data limit that corresponds to an amount of data that can be transmitted during the time window. The data limit may be determined prior to transmitting the cached sensor measurements and be based on the current network bandwidth of the mobile device, signal strength of a radio of the mobile device, signal to noise ratio, signal quality, combinations thereof, and the like. If the cached sensor measurements can be transmitted during the time window, then the process moves to block 432. If, at block 424, it is determined that the cached sensor measurements cannot be transmitted during the time window (e.g., the data size of the cached sensor measurements is greater than the data limit), the process continues at block 436.

At block 432 (when it is determined that the cached sensor measurements can be transmitted during the time window), it is determined that the cached sensor measurements were completely transmitted within the time window. The data collection application may then terminate at the end of the time window. The process may then return to block 404 in which sensor measurements are collected by the mobile device while the data collection application is not executing. The process may continue (at block 408) upon detecting the receipt of a subsequent notification.

At block 436 (when it determined that the cached sensor measurements cannot be transmitted within the time window), the portion of the cached sensor measurements that cannot be transmitted during the time window is identified. In some embodiments, the mobile device identifies the portion of the cached sensor measurements that cannot be transmitted with the time window. In some instances, the mobile device may transmit the oldest sensor measurements during the time window causing block 436 to identify the more recent cached sensor measurements as being sensor measurements that could not be transmitted within the time window. In other instances, the mobile device transmits the most recent cached sensor measurements during the time window causing block 436 to identify the older cached sensor measurements as being sensor measurements that could not be transmitted within the time window.

At block 440, the identified portion of the cached sensor measurements are transmitted via a background process. In some embodiments, the mobile device may transmit the identified portion of the cached sensor measurements that cannot be transmitted within the time window to the server via a background process. The background process may include a background fetch, a background processing task, or any other background process. For example, background fetch allows applications to execute certain processes by the operating system as background processes (e.g., when the application is not running and outside the view of the user). The data collection application may request that the portion of the cached sensor measurements that cannot be transmitted within the time window be transmitted in a background process. The data collection application may then terminate. The mobile device may then execute the transmission of the portion of the cached sensor measurements at a later time in a background process. The later time may be a time in which the mobile device has sufficient processing and/or network resources to transmit the portion of the cached sensor measurements.

Alternatively, or additionally, the later time may be a time that is some predetermined time after the time in which the background process is requested. The background process may be executed by an operating system of the mobile device and without the data collection application executing. Once the background process is requested, the process may return to block 404 where the mobile device continues to collect sensor measurements until a subsequent notification is received.

Block 436 may optionally continue to block 444 in addition to, or in place of, block 440. At block 444, driving events in the portion of the cached sensor measurements are detected. In some embodiments, the mobile device detects events using the portion of the cached sensor measurements that could not be transmitted within the time window. The events may include an identification of the event and the time in which the event occurred. Since events may include two data fields, events may take up significantly less data than the sensor measurements that correspond to the event. The data collection application may transmit or schedule the transmission (e.g., via background fetch) of the identified events in place of the corresponding sensor measurements to further reduce the data being transmitted to the server. Examples of events include hard brakes, vehicle collisions, missed drives (e.g., a drive may be a time interval over which a vehicle is in operation that was not detected by the data collection application), distracted driving, mobile phone use, speeding, aggressive driving, other driving behaviors, combinations thereof, or the like.

At block 448, the detected events are transmitted via a background process. In some embodiments, the mobile device requests that the events identified in block 436 be transmitted via a background process to the server. The data collection application may then terminate with the expiration of the time window. The mobile device may transmit the events in the background process at a later time without executing the data collection application. Once the background process is requested, the process may return to block 404 where the mobile device continues to collect sensor measurements until a subsequent notification is received. Blocks 444-448 may be executed in place of block 440 or in addition to block 444. When executing in addition to block 440, blocks 444-448 may be executed in series (e.g., either before or after block 440) or in parallel (e.g., at the same time) with block 440.

It should be appreciated that the specific steps illustrated in FIG. 4 provide a particular method for transmitting historical sensor measurements through a background process according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
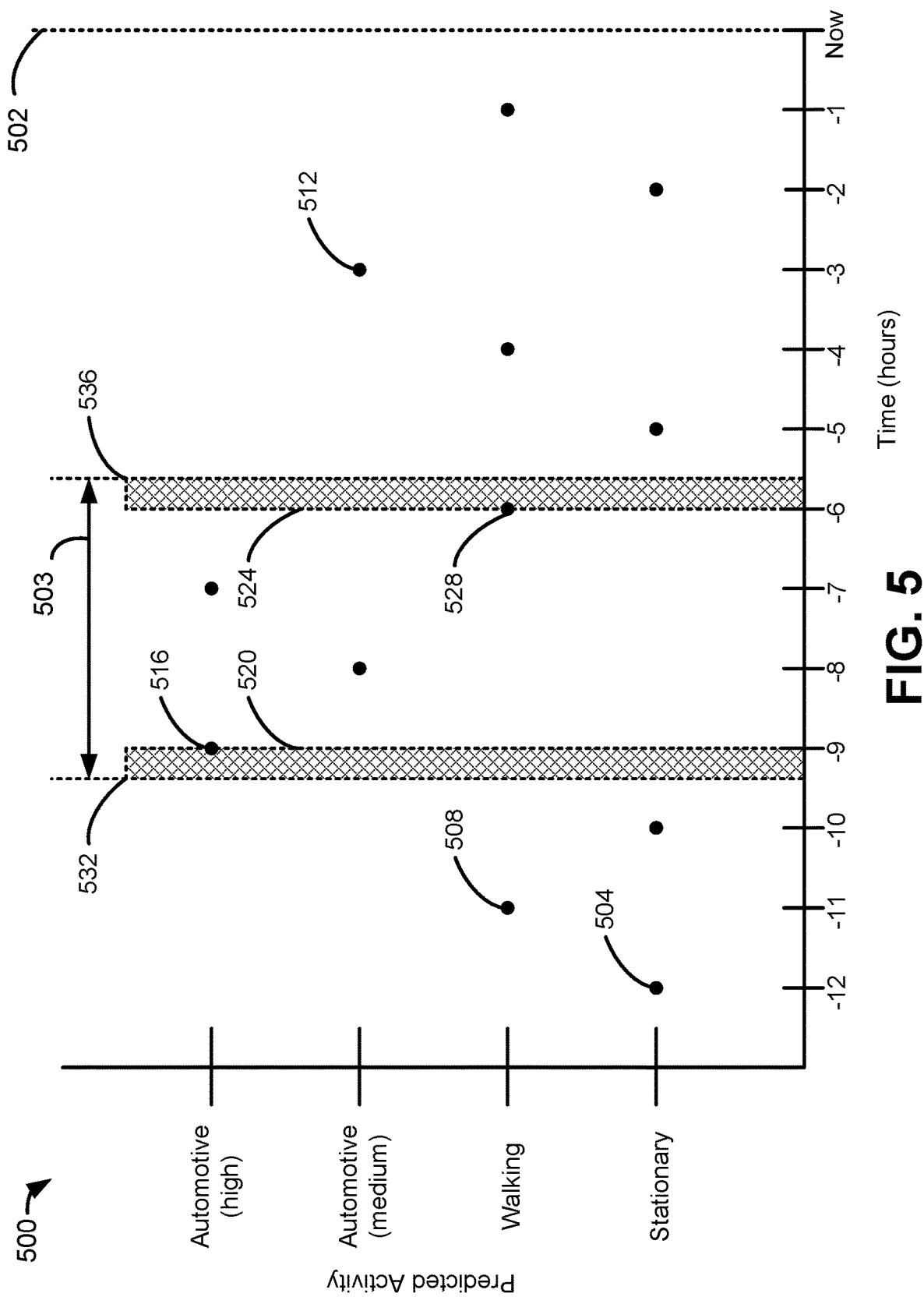
FIG. 5 depicts an exemplary representation of a graph data structure generated by an activity detection engine data according to some embodiments.

FIG. 5 depicts an exemplary representation of a graph data structure 500 generated by an activity detection engine according to some embodiments. The mobile device may record activity data that corresponds to a prediction of a contemporaneously occurring activity based on sensor measurements collected by the mobile device (e.g., separate from the sensor measurements collected by the data collection application). For example, the operating system of the mobile device may generate a probability of a contemporaneous activity of the mobile device (e.g., a probability that the mobile device is with a user who is stationary, walking, running, cycling, driving, flying, or the like) at each of discrete times over a predetermined time interval (e.g., the collection time interval). The predetermined time interval may correspond to a time interval requested by a data collection application for the collection of sensor measurements while the data collection application is not executing or is minimally executed (e.g., executed periodically over a small portions of the predetermined time interval). The activity detection engine may store the activity data generated by the operating system over the predetermined time interval. The activity detection engine may use the activity data to identify events that occurred during the predetermined time interval such as drives (e.g., where the mobile device was positioned within a vehicle while the vehicle traveled from first location to a second location) without necessarily using location services (e.g., the mobile device detects the occurrence of the drive, but not necessarily the location of the vehicle along the drive).

The activity detection engine may generate a graph data structure using the activity data received from the operating system. As previously described, the activity data includes, but is not limited to, a probability that the mobile device is: stationary, walking (e.g., the mobile device is with a user who is walking), driving low (e.g., low probability that the mobile device is with a user that is driving), drive medium (e.g., medium probability that the mobile device is with a user that is driving), drive high (e.g., a high probability that the mobile device is with a user that is driving), cycling (e.g., the mobile device is with a user that is cycling), flying (e.g., the mobile device is with a user that is flying) and the like. Other activities may be represented by the graph data structure such as those enumerated by a user (e.g., through user input or the like) or those detected by another application of the mobile device. The activity detection engine may receive identification of a quantity of activities over the preceding time interval. The activity detection engine may receive an identification of an activity in regular intervals (e.g., by polling the operating system at the expiration of each interval). Alternatively, the activity detection engine may receive an indication of an activity each time the operating system detects a new activity (e.g., as a push notification from the operating system).

In some instances, the activity detection engine may receive a probability (e.g., a confidence that the activity is occurring) for each of multiple activities. In those instances, the activity detection engine represents, in the graph data structure, the activity with the highest probability. Alternatively, the activity detection engine may represent only those activities with a probability that exceeds a threshold. For instance, the activity detection engine may only represent activities with a probability that exceeds 40% in the graph data structure. If no activities exceed the 40% threshold, the graph data structure may not include activities at that time (e.g., the activity may be represented as a null value). Alternatively, the data collection engine may represent all activities in the graph data structure with the corresponding probability of each activity.

Graph data structure 500 includes a preceding time interval of twelve hours from a wake event (e.g., a time in which the data collection application is executed or wakes from suspension). The ordinate of graph data structure 500 represents predicted activities and their associated probability. The abscissa of graph data structure 500 represents time going backwards from a waking event, such as wake event 502. A waking event may be any predetermined event such as, but not limited to, the mobile device crossing, or otherwise going outside of, a geofence (or any particular boundary), a visit notification, a notification from a notification service (e.g., such as a push notification or silent push notification), a scheduled time, detecting sensor data indicative of movement, or the like. A visit notification may be a notification from the operating system of the mobile device indicating that the mobile device is located at a location for long enough that the operating system determines that the mobile device is "visiting" the location. The visit may correspond to any location in which the mobile device is positioned for a time interval that is greater than a threshold time interval. For example, a location may correspond to an establishment (e.g., a business, public institution, residence, or the like).

As shown, the activity detection engine may receive activity data in regular intervals such as each hour of the preceding twelve-hour time interval. Graph data structure 500 represents the activity having the highest probability (if more than one activity was received). For instance, at minus twelve hours (e.g., twelve hours prior to execution of the data collection application) activity 504 corresponds to stationary, at minus eleven hours activity 508 corresponds to walking, at minus three hours activity 512 corresponds to a medium probability of automotive activity, and at minus nine hours activity 516 corresponds to a high probability of automotive activity.

The activity detection engine may detect a drive 503 using the activity data of graph data structure 500. For instance, the activity detection engine detects a first time 520, which is an earliest time in which an activity of drive high is detected. The activity detection engine may detect activity 516 (at nine hours prior to execution of the data collection application) as the activity that corresponds to the first time 520. In some instances, the activity detection engine identifies the earliest time of any driving activity (e.g., a medium or high probability of automotive activity). The activity detection engine may then identify a second time 524, which may be the earliest time after the first time in which a different activity is detected. For example, the activity detection engine identifies activity 528 as being the next activity that is not a drive activity. The different activity may be any activity other than a driving activity, such as walking or stationary (as shown in the example described by graph data structure 500). In some instances, the different activity may be any activity that is associated with anything other than a high probability of automotive activity (e.g., a medium probability of automotive activity, walking, cycling, or stationary). For instance, the second time may correspond to automotive activity, even if the probability of automotive activity occurring is medium, low, or zero. The activity detection engine then identifies a drive that occurred between the first time 520 and the second time 524, which corresponds to a time interval that includes minus nine hours to minus six hours.

The activity detection engine may then determine if another drive occurred by identifying a third time, which is an earliest time after the second time in which a driving activity is detected and a fourth time, which is an earliest time after the third time in which an activity other than a drive was detected. The process may continue until all drives are identified within the predetermined time interval. Although the process of identifying drives begins by analyzing from an earliest time (e.g., minus twelve hours) to a waking time, the process may operate by analyzing activity data from the waking time towards the earliest time (e.g., identifying the first time as the closest time to the waking time in which an activity of driving high is detected and a second time as being a later time than the first time in which a non-driving activity is detected).

The data collection application may use the activity data to identify a drive within cached sensor measurements. The data collection application may then isolate the portion of the sensor measurements collected by the operating system that correspond with the drive. This prevents the data collection application from having to analyze the entire cached sensor measurements when only a portion of those measurements correspond to a time interval (e.g., the drive) of interest. For example, the data collection application may request, from the cached sensor measurements collected by the operating system, only those sensor measurements that correspond to the time interval over which a drive or an event of interest occurred.

In some instances, there may be a delay between the beginning of a drive and when the operating system detects a drive activity. The data collection application may not obtain all of the cached sensor measurements that correspond to a drive. For instance, if a drive begins five minutes before the operating system detects a high probability of a driving activity, then the data collection application may not identify the portion of the sensor measurements corresponding to the first five minutes as being part of the drive.

The data collection application may correct for the delay by requesting sensor data over a larger time interval than the time interval during which the drive occurred. The data collection application may request sensor measurements over a second time interval that begins at third time 532 prior to the first time and ends at a fourth time 536 after the second time. For example, the third time 532 may be ten minutes prior to the first time and the fourth time 536 may be ten minutes after the second time. The time interval between the first time 520 and third time 532 and the second time 524 and fourth time 536 may be the same or different. The time interval between the first time 520 and third time 532 and the second time 524 and fourth time 536 may be of any predetermined length (e.g., thirty seconds, ten minutes, thirty minutes, etc.), or dynamically determined based on previously detected or identified drives, available sets of sensors, particular sensor values, or the like.

Figure 6:
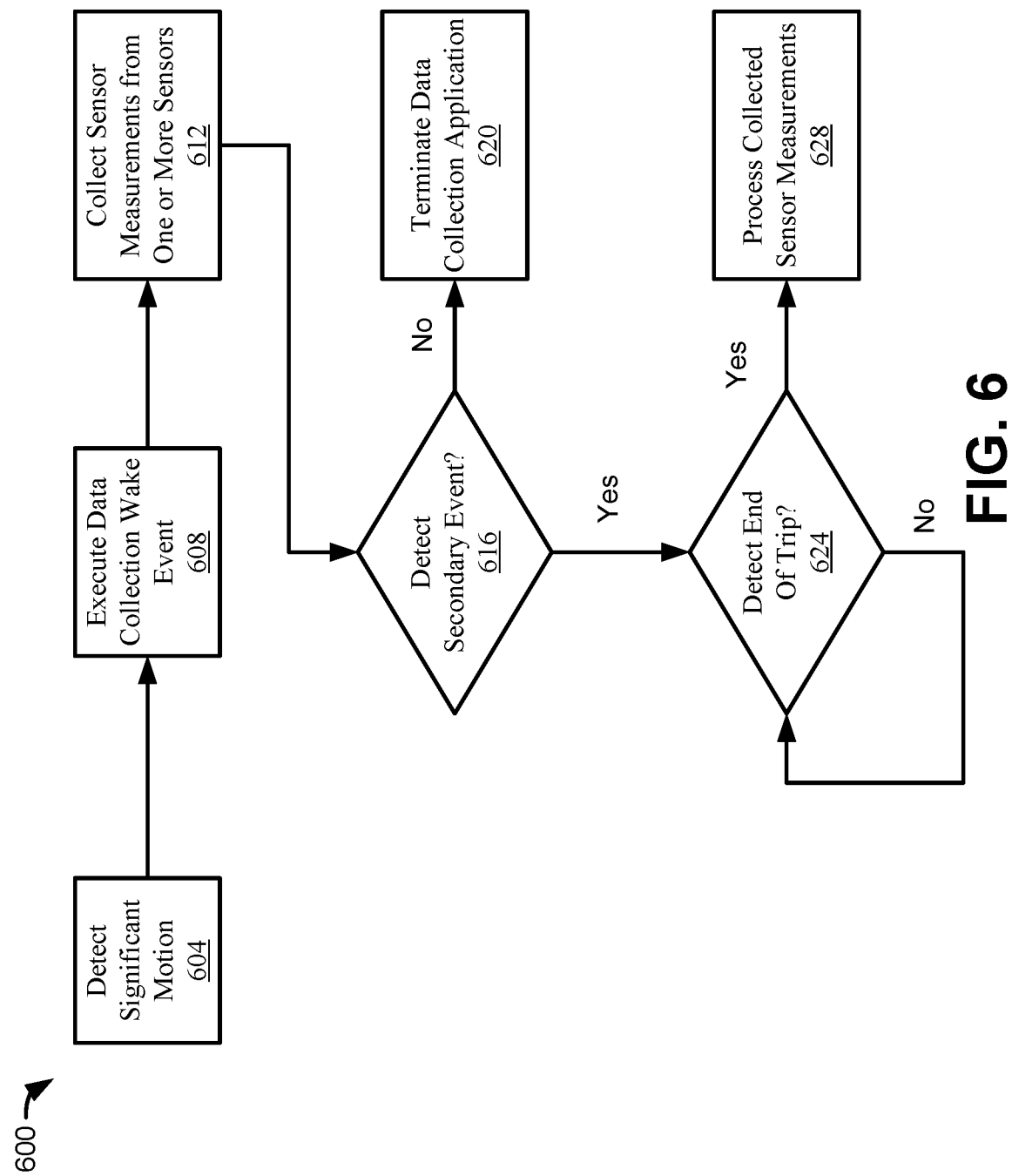
FIG. 6 depicts a flowchart of an exemplary process for collecting sensor measurements based on a sensor of a mobile device according to certain embodiments of the present disclosure.

FIG. 6 depicts a flowchart of an exemplary process 600 for collecting sensor measurements based on a sensor of a mobile device according to certain embodiments of the present disclosure. In some embodiments, one or more steps of process 600 may be performed by a mobile device, as described above. At block 604, process 600 involves detecting significant motion. For example, a mobile device may receive an indication from the operating system, that significant motion has been detected. This indication is based on data obtained from one or more sensors of the mobile device. The sensor may be a raw sensor (e.g., such as an accelerometer) or a virtual sensor (e.g., a construct that derives measurements from measurements collected from one or more other sensors). An example of a virtual sensor is a significant motion sensor that outputs an indication of significant motion by the mobile device, e.g., motion of the mobile device that exceeds a threshold. The indication of significant motion may be a Boolean value (e.g., significant motion detected or no significant motion detected), a numerical value (e.g., between 0 and 1 or 1 and 10, etc.), a range, or the like. The sensor may indicate when the mobile device is moved more than a threshold amount. In some instances, the output from the sensor may be used to detect the occurrence of an event. For instance, upon detecting significant motion, another process of the mobile device may interpret the significant motion as corresponding to an event type. Examples of event types include, but are not limited to, walking, running, cycling, driving, flying, or the like and may be determined by the magnitude of the motion detected by the sensor.

In some instances, the other process may define success thresholds to interpret the measurements collected from the sensor. For instance, if the significant motion is greater than a first threshold, then a walking event type may be detected. If the significant motion is greater than a second threshold, then a running event type may be detected. If the significant motion is greater than a third threshold, then a cycling event type may be detected. If the significant motion is greater than a fourth threshold, then a driving event type may be detected. If the significant motion is greater than a fifth threshold, then a flying event type may be detected. Other thresholds may be set to identify other event types. Thus, the sensor that indicates significant motion of the mobile device may be a physical sensor, a virtual sensor, an application running on the mobile device, e.g., in the background, that processes data obtained from one or more physical and/or virtual sensors and generates an output indicating that significant motion has occurred, or the like.

The sensor may be correlated with a location services sensor (e.g., from a GPS sensor, Wi-Fi, cellular tower triangulation, or any other service of the mobile device or a remote device that determines a location of the mobile device) to further improve the accuracy of the detection of the occurrence of the event type. In some instances, the use of location services may be avoided to maintain resource consumption of the mobile device at a particular level.

At block 608, process 600 involves executing a data collection wake event. The data collection wake event may be executed on the mobile device. The data collection wake event initiates execution of a data collection application that was not executing (or was in a suspended state). The data collection wake event may be as a result of a notification from a sensor of the mobile device indicating that significant motion has been detected. The notification can be generated using a significant motion sensor of the mobile device. The sensor may be a raw sensor (e.g., such as an accelerometer) or a virtual sensor (e.g., a construct that derives measurements based on measurements collected from one or more sensors including the accelerometer or separate from the accelerometer). Thus, both hardware and software can be components of the sensor. The sensor may indicate when the mobile device has moved or is moving more than a threshold amount. In some instances, the sensor may be used to detect an occurrence of an event. For example, the notification from the sensor may be analyzed in conjunction with accelerometer measurements to detect the occurrence of an event, may trigger a process in which other sensors or activity data is used to determine whether the user is engaging in behavior of interest, such as driving, or the like. Continuing the example above, the data collection wake event may causes the mobile device to execute the data collection application.

At block 612, process 600 involves collecting sensor measurements from one or more sensors. The one or more sensors may be a part of the mobile device. Alternatively, or additionally, the one or more sensors may be distributed across the mobile device and a device external to the mobile device. In some embodiments, the data collection application begins collecting sensor measurements from one or more sensors of the mobile device. The data collection application may select which sensors to obtain sensor measurements from based on the event type. For example, the data collection application may collect sensor measurements from an accelerometer and a gyroscope when the event type is a driving event type and collect sensor measurement from just the accelerometer when the event type is a walking event type. Alternatively or additionally, the data collection application may select a sampling rate for each sensor based on the event type. For example, the data collection application may select a higher sampling rate when the event type is a driving event type and a lower sampling rate when the event type is a walking event type. The data collection application may continue to collect sensor measurements until another event type is detected (e.g., during the drive), the sensor indicates that the mobile device is stationary for a predetermined time interval, user input, or the like.

At block 616, process 600 involves detecting a secondary event. In some embodiments, the mobile device determines whether a secondary event is detected. A secondary event may be an event that increases or decreases the probability that a drive is occurring. For instance, the secondary event may include the mobile device crossing a geofence (e.g., a virtual fence that surrounds the mobile device and triggers a notification when the mobile device cross it). If the geofence is crossed, then it is more likely that the mobile device is positioned within a moving vehicle. If the sensor indicates that a drive is occurring, but the geofence is never crossed, then it is less likely that a drive is occurring (e.g., likely that the sensor issued a false positive). The secondary event may include detecting sensor measurements (e.g., accelerometer data measured at a given frequency such as 50 Hz, or the like) that are greater than a threshold, detecting change in location (e.g., using an accelerometer, GPS sensor, or the like), detecting the crossing of a geofence, user input (e.g. such as a selection of a route to a destination location, messages indicating traveling or a change in location, or user selection of a route, connecting to a Bluetooth beacon in a vehicle, or the like), a notification, or the like.

At block 620, if a secondary event is not detected (e.g., the significant motion may have been a false positive), process 600 involves terminating the data collection application (block 620). Terminating the data collection application may include returning to a hibernation state and/or running the data collection application as a background process of the mobile device. In some embodiments, the data collection application will terminate until a subsequent significant motion is detected again at block 604 after which a new data collection wake event will be executed.

At block 624, if a secondary event is detected at block 616, then the process 600 involves detecting the end of a trip (block 624). In some embodiments, the data collection application continues to collect sensor measurements until an end of the drive is detected. The end of the drive may be detected by the sensor, by sensor measurements falling below a threshold, a GPS sensor indicating no changes in location, combinations thereof, or the like.

At block 628, process 600 involves processing the collected sensor measurements. In some embodiments, the mobile device processes the collected sensor measurements. This may include detecting one or more events that occurred during the drive such as, but not limited to, hard braking, aggressive driving (e.g., frequency changes in acceleration that are greater than a threshold), distracted driving, swerving, speeding, mobile phone use, other driving behaviors, combinations thereof, and the like. Alternatively or additionally, the mobile device may transmit the collected sensor measurements to a server for processing. In some instances, the mobile device may process the collected sensor measurements and/or transmit the collected sensor measurements as the sensor measurements are being received by the mobile device. Once the collected sensor measurements are processed (and/or transmitted to the server), the data collection application terminates.

It should be appreciated that the specific steps illustrated in FIG. 6 provide a particular method for collecting sensor measurements based on a sensor of a mobile device according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
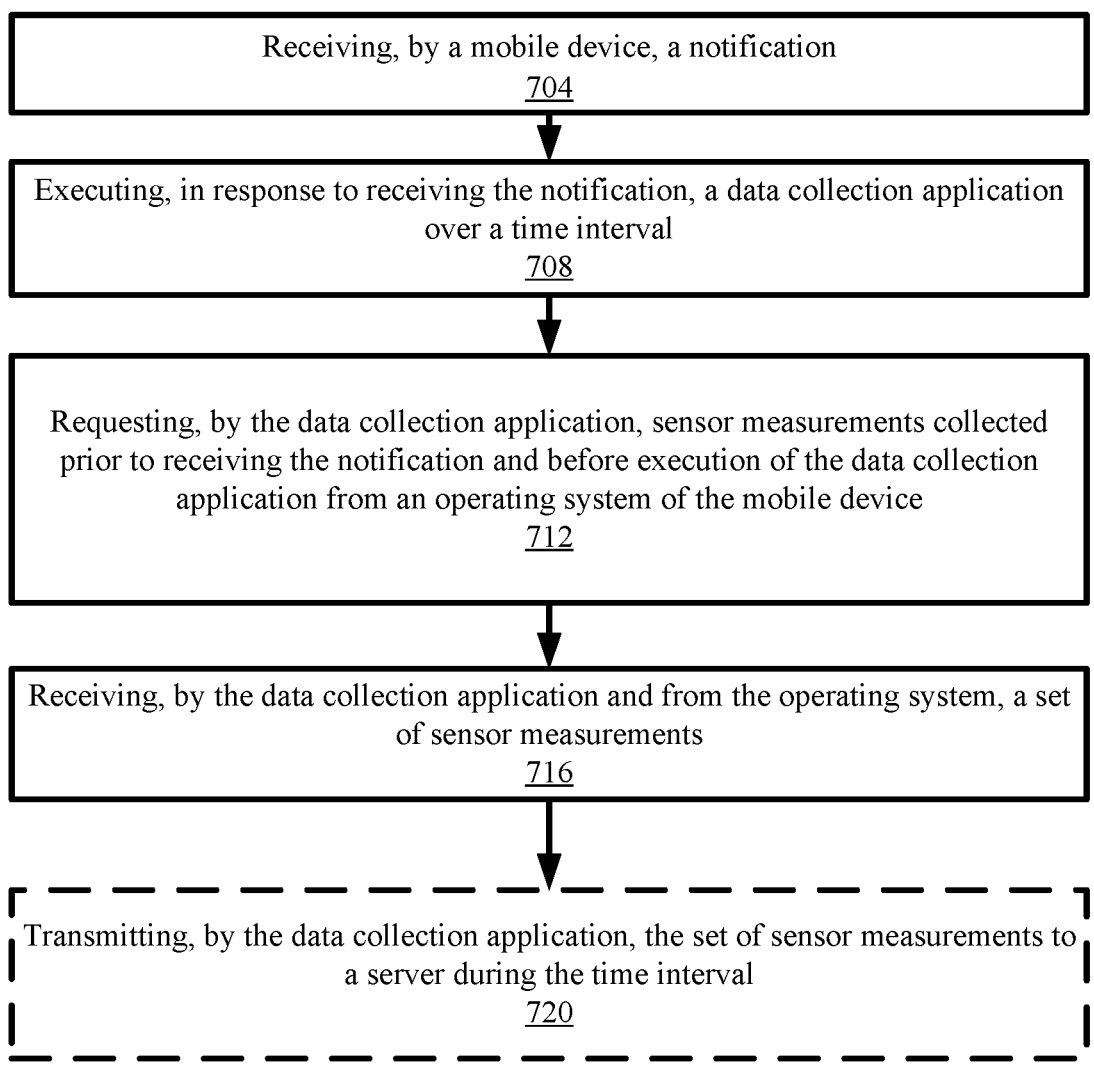
FIG. 7 depicts a flowchart of an exemplary process for collecting and transmitting historical sensor measurements according to certain embodiments of the present disclosure.

FIG. 7 depicts a flowchart of an exemplary process 700 for collecting and transmitting historical sensor measurements, according to certain embodiments of the present disclosure. At block 704, process 700 involves receiving a notification by a mobile device. The notification may be a communication transmitted from an internal process of the mobile device or from a remote device, for example, a remote cloud server, that includes an identification of an application of the mobile device that was designated by the data collection application, a remote application, or operating system to transmit a notification to the data collection application upon detecting an event. Examples of events may be detecting sensor measurements that are greater than a threshold (e.g., from a significant motion sensor, accelerator, and/or other sensors), detecting that time interval has expired, detecting a communication (e.g., from an inter-process communication or from a remote device), combinations thereof or the like. For instance, the data collection application may request that the internal process transmit a notification to the data collection application in regular intervals. In another example, the notification may be a push notification or a silent push notification transmitted from a remote device such as a server. In some embodiments, the notification is generated by a local process of the mobile device based on an increase in the likelihood of motion of the mobile device.

In some instances, the notification may be received according to a schedule. For instance, the notification may be received at regular intervals, dynamic intervals (that change over time based on the collected sensor measurements, processing or network bandwidth of the mobile device, or the like), or the like. For example, if the data size of previously collected sensor measurements is greater than a threshold (e.g., such as the data limit), then the frequency in which subsequent notifications may be received may be increased (e.g., to decrease the collection time interval). Increasing the notification frequency increases the frequency of transmissions and the likelihood that the sensor measurements that are collected can be transmitted within the executing time interval. In some instances, the notifications may be timed such that a notification is received upon collecting a predetermined quantity or data size of sensor measurements. For example, the predetermined quantity or data size of sensor measurements may be based on an amount of data that can be transmitted during the execution time interval.

At block 708, process 700 involves executing a data collection application over a time interval in response to receiving the notification. The time interval may correspond to an execution time interval for the data collection application. The execution time interval may be based on a predetermined time interval (e.g., set by the operating system of the mobile device), a data size of sensor measurements that were previously collected, a quantity of the sensor measurements that were previously collected, or the like. While the data collection application is executing, it may transmit a request to the operating system for the operating system to collect and store additional sensor measurements over a subsequent execution time interval. The subsequent execution time interval may be of a same or different length from the execution time interval. In some embodiments, the operating system of the mobile device automatically collects sensor measurements and stores them in a cache, such as a ring buffer. In this example, process 700 may proceed directly to block 712 in order to request the sensor measurements previously collected by the operating system of the mobile device.

At block 712, process 700 involves requesting, by the data collection application, sensor measurements collected prior to receiving the notification and before execution of the data collection application from an operating system of the mobile device. Each time the data collection application executes, the data collection application may request that the operating system collect sensor measurements over a collection time interval that begins at a current time and ends at the next time the data collection application is executed. Upon executing, the data collection application may request, from the operating system, the sensor measurements collected over the preceding collection time interval (e.g., prior to receiving the notification) while the data collection application was not executing. At block 716, process 700 involves the data collection application receiving a set of sensor measurements from the operating system. The set of sensor measurements correspond to the requested sensor measurements that were collected over the preceding collection time interval.

At block 720, process 700 involves transmitting, by the data collection application, the set of sensor measurements to a server during the time interval. For example, while the data collection application is executing during the time interval, it may transmit the sensor measurements collected by the operating system prior to receiving the notification to a remote server. In some embodiments, the data collection application may terminate upon the expiration of the time interval. In some instances, the data collection application may not be able to transmit the full set of sensor measurements within the time interval. In those instances, the data collection application may identify a subset of the set of sensor measurements that cannot be transmitted within the time interval. The data collection may transmit the subset of the set of sensor measurements via a background process of the mobile device (e.g., such as background fetch, background processing task, or any process executing in the background of the mobile device). Alternatively, the data collection application may transmit the subset of the set of sensor measurements during a subsequent execution time interval (along with other sensor measurements) that begins when the mobile device receives a subsequent notification.

For example, the mobile device may receive a subsequent notification from the server and execute the data collection application over a subsequent time interval. The data collection application may request new sensor measurements collected between when the data collection application terminated and when the subsequent notification is received. The data collection application may then transmit the subset of the set of sensor measurements that the data collection application was unable to transmit during the time interval to the server along with the new sensor measurements.

In some instances, rather than transmitting the set of sensor measurements, for example, if the data collection application cannot transmit the set of sensor measurements, the data collection application may process the set of sensor measurements. For instance, the data collection application may down-sample the set of sensor measurements to reduce the data size of the set of sensor measurements to generate an abbreviated data set. After down-sampling the set of sensor measurements to create the abbreviated data set, the data collection application may then transmit the down-sampled set of sensor measurements. Alternatively, the data collection application may process the set of sensor measurements to detect one or more events, using the set of sensor measurements, that occurred when the set of sensor measurements were being collected. Examples of events include, but are not limited to, speeding, hard braking, distracted driving, swerving, aggressive driving, lane departure (e.g., driving over rumble strips or partially or entirely off-road), collisions, other driving behaviors, and the like. Detecting one or more events that occurred during collection of the sensor measurements may enable the data collection application to generate metadata that corresponds to an event or one or more events. The metadata may characterize the events. For instance, the metadata may include a timestamp of the event, sensor measurements that correspond to the event, other sensor measurements collected during the event, other events detected at the same time or within a certain temporal proximity, a relative location in which the event occurred (e.g., using location services or determined using other sensors of the mobile device), combinations thereof, or the like. The data collection application may transmit an identification of the one or more events and/or the metadata during the execution time interval in place of or in addition to the set of sensor measurements or a subset of the set of sensor measurements. If, for example, the user of the mobile device is stationary for an extended period of time, for instance, at an office during working hours, the set of sensor measurements may include long periods of negligible acceleration. In this case, processing of the set of sensor measurements may be performed to define an activity or confirm existing activity data using the set of sensor measurements.

In other instances, the data collection application may not transmit the set of sensor measurements, the one or more events, or the metadata. Instead, the data collection application may store the set of sensor measurements, the one or more events, or the metadata. The data collection application may then display the set of sensor measurements, the one or more events, and/or the metadata through a user interface on a display of the mobile device. A user, through interaction with the user interface, may process the set of sensor measurements, view the one or more events, view the corresponding metadata of an event, and selectively transmit some or all of the set of sensor measurements, some or all of the one or more events, and/or some or all of the metadata.

Notifications may continue to be received according to the schedule, with each notification causing the mobile device to execute the data collection application, obtain sensor measurements collected over a preceding time interval, transmit the sensor measurements to a server within the time interval, and terminate the data collection application until the next notification is received. Thus, the process illustrated in FIG. 7 can be repeated, enabling collection of sensor measurement data over a continuous time period. As an example, if the process illustrated in FIG. 7 is repeated every two hours, thereby collecting two hours of sensor measurements, repetition of the process 12 times will result in collection of data over a 24-hour period.

In addition to the use of a notification received by the mobile device as illustrated in FIG. 7, other mechanisms can be used to trigger the collection of historical data stored in the sensor cache. As an example, if the mobile device connects to a vehicle, for example, via Bluetooth, this connection can be detected and utilized to initiate the data collection process. Therefore, in addition to notifications and sensor-based motion detection, other indications that the likelihood of motion has increased can be utilized to trigger data collection. As an example, the Bluetooth connection discussed above can indicate that motion, such as a drive, is more likely to occur, despite the fact that only limited motion has occurred. Thus, examples of the present invention are not limited to receipt of a notification, for example, from a server, or an indication of motion of the mobile device as a trigger to initiate data collection since an indication of an increase in the likelihood of future motion can be utilized in generating a trigger. For example, a local process of the mobile device may indicate an increase in the likelihood of future motion. Moreover, as an example, a background task performed by the mobile device could be utilized to trigger the data collection process. Running at a periodic frequency, the background task could trigger the data collection application to request sensor measurements from the operating system of the mobile device. Thus, rather than initiation resulting from receipt of a notification as illustrated in FIG. 7, the processes described herein can be initiated by a background task available through the operating system of the mobile device.

It should be appreciated that the specific steps illustrated in FIG. 7 provide a particular method for collecting and transmitting historical sensor measurements according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
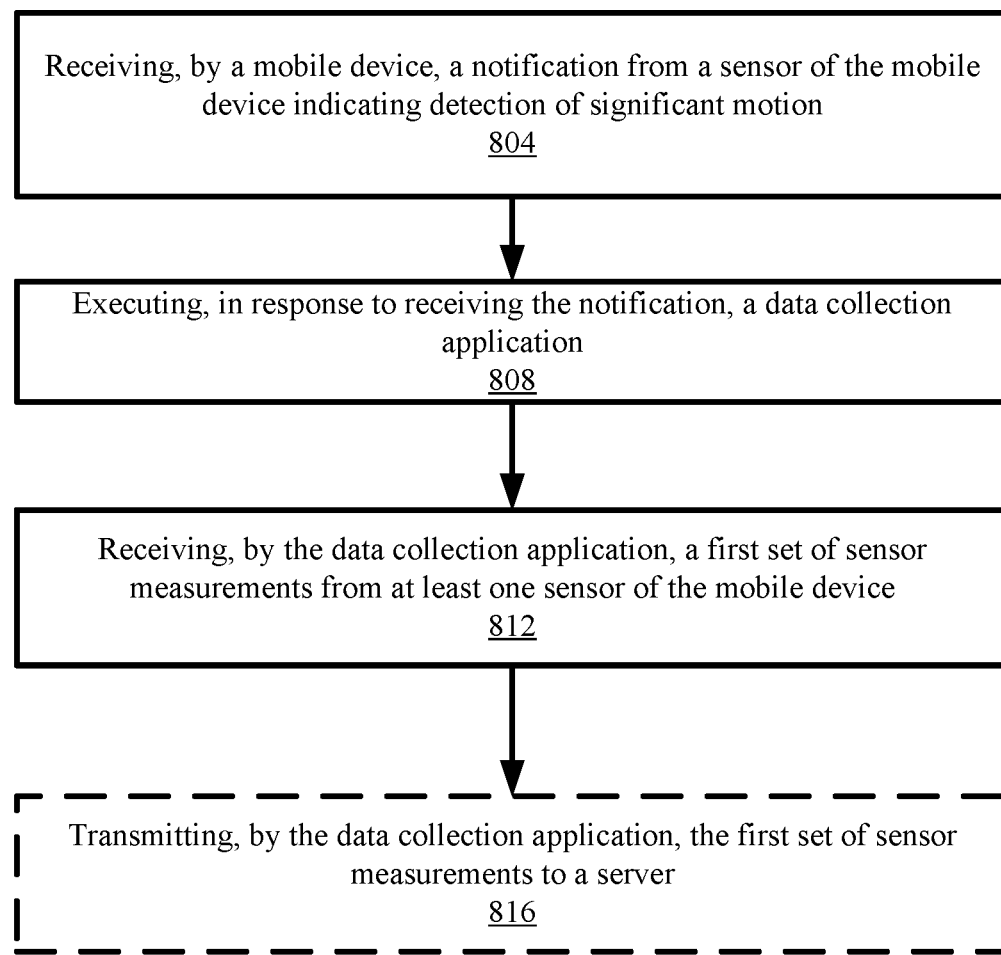
FIG. 8 depicts a flow chart of an exemplary process for collecting sensor measurements based on a sensor of the mobile device according to certain embodiments of the present disclosure.

FIG. 8 depicts a flow chart of an exemplary process 800 for collecting sensor measurements based on a sensor of the mobile device according to certain examples of the present disclosure. At block 804, process 800 involves receiving, by a mobile device, a notification from a sensor of the mobile device indicating that significant motion has been detected. The notification can be generated using a significant motion sensor of the mobile device. The sensor may be a raw sensor (e.g., such as an accelerometer) or a virtual sensor (e.g., a construct that derives measurements based on measurements collected from one or more sensors including the accelerometer or separate from the accelerometer). Thus, both hardware and software can be components of the sensor. The sensor may indicate when the mobile device has moved or is moving more than a threshold amount. In some instances, the sensor may be used to detect an occurrence of an event. For example, the notification from the sensor may be analyzed in conjunction with accelerometer measurements to detect the occurrence of an event, may trigger a process in which other sensors or activity data is used to determine whether the user is engaging in behavior of interest, such as driving, or the like.

Examples of events include, but are not limited to walking, running, cycling, driving, flying, or the like. For example, the sensor may be used to determine when the mobile device is positioned within a moving vehicle so that the mobile device may capture sensor measurements that correspond to the drive. In some instances, the sensor may then disable itself for a predetermined time interval after detecting significant motion to prevent duplicate indications of the event. In some examples, once a notification that indicates that significant motion of the mobile device has occurred, data from one or more sensors may be analyzed to determine whether the motion of the mobile device (and corresponding user behavior) correlates with one or more events as discussed above. Thus, the notification based on significant motion can be utilized to initiate one or more analysis processes in addition to being used as a trigger to collect sensor data. One of ordinary skill in the art would recognize many variations, modifications, and alternatives.

At block 808, process 800 involves executing a data collection application in response to receiving the notification. The data collection application may be configured to execute over a predetermined time interval to collect sensor measurements. For instance, the predetermined time interval may begin upon receiving the notification and end when the measurements from the sensor associated with the notification of a significant motion event or any other sensor of the mobile device indicate that the mobile device is stationary for a threshold time interval.

At block 812, process 800 involves receiving, by the data collection application, a first set of sensor measurements from at least one sensor of the mobile device. The first set of sensor measurements may correspond to sensor measurements collected over the predetermined time interval. While collecting the set of sensor measurements, the data collection application and/or another process of the mobile device may be configured to detect a secondary event. The secondary event may be an event that increases or decreases the likelihood that a drive or other user behavior of interest is occurring. For instance, the secondary event may indicate that the notification generated as a result of an indication from the sensor was a false positive (e.g., the sensor indicated that the mobile device is in a moving vehicle when the mobile device is not). The secondary event may include, but is not limited to, crossing a geofence, detecting sensor measurements from other sensors that are greater than a threshold, user input, a notification, a GPS sensor, combinations thereof, and the like.

As an example, detecting that a geofence has been crossed may increase or decrease the likelihood that the notification generated as a result of an indication from the sensor was a false positive (indicating that the mobile device is more likely to be in a vehicle during a drive or less likely to be in a vehicle during a drive respectively). If the geofence is crossed, then it may be more likely that the notification generated as a result of an indication from the sensor is correct. If the geofence has not been crossed, then it may be more likely that the notification generated as a result of an indication from the sensor is a false positive. Although some examples are discussed in relation to a drive, this is not required and the data collection process and sensor data obtained thereby can be utilized independent of a detected drive. As an example, if the sensor detects significant motion, data collection can be initiated and/or historical data can be accessed to detect a crash despite the fact that no drive had been previously detected. Thus, examples of the present invention are not limited to the context of a detected driving event.

If the secondary event indicates that the notification generated as a result of an indication from the sensor was a false positive, then the data collection application may delete the set of sensor measurements and terminate. The data collection application may be executed again upon receiving a new notification from the sensor. Alternatively, the data collection application may request confirmation (e.g., via a notification to a user, user input, a user interface displayed to the user, or the like) that the trip is or is not occurring. If the drive is occurring, the process continues to block 816. If the drive is not occurring, the data collection application may delete the set of sensor measurements and terminate.

In addition to receiving the first set of sensor measurements, historical data can additionally be accessed after receipt of the notification. As an example, referring to FIG. 7, sensor measurements stored in a sensor cache may be accessed and used to supplement the first set of sensor measurements. Accordingly, examples of the present invention enable the acquisition and use of not only data collected after receipt of the notification, but also of historical data collected prior to receipt of the notification, using the methods and systems described in relation to FIG. 7.

At block 816, process 800 involves transmitting the first set of sensor measurements to a server by the data collection application. In some instances, the data collection application may continuously transmit collected sensor measurements to the server (e.g., in a stream or in regular intervals). In other instances, the data collection application may wait until sensor measurements are no longer being collected (e.g., after the drive has concluded), then transmit the set of sensor measurements to the server. As discussed in relation to FIG. 7, in some examples, the set of sensor measurements can be processed before transmission of the sensor measurements, metadata associated with the sensor measurements, down sampled data based on the sensor measurements, or the like. In some instances, the data collection application may detect one or more events from the set of sensor measurements. The one or more events include, but are not limited to, hard braking, aggressive driving (e.g., frequency changes in acceleration that are greater than a threshold), distracted driving, swerving, speeding, mobile phone use, other driving behaviors, combinations thereof, and the like. In those instances, the data collection application may transmit an identification of the event and a timestamp indicative of when the event occurred. The data collection application may transmit the one or more events in addition to the set of sensor measurements or in place of the set of sensor measurements. For example, transmitting the one or more events in place of the set of sensor measurements may significantly reduce the amount of data that is transmitted to the server (e.g., reducing network usage). Once the set of sensor measurements (and/or the one or more events) is transmitted to the server, the data collection application terminates. The data collection application may be executed again upon receiving a new notification from the sensor (returning to block 804 of the process).

It should be appreciated that the specific steps illustrated in FIG. 8 provide a particular method for collecting sensor measurements based on a sensor of the mobile device according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
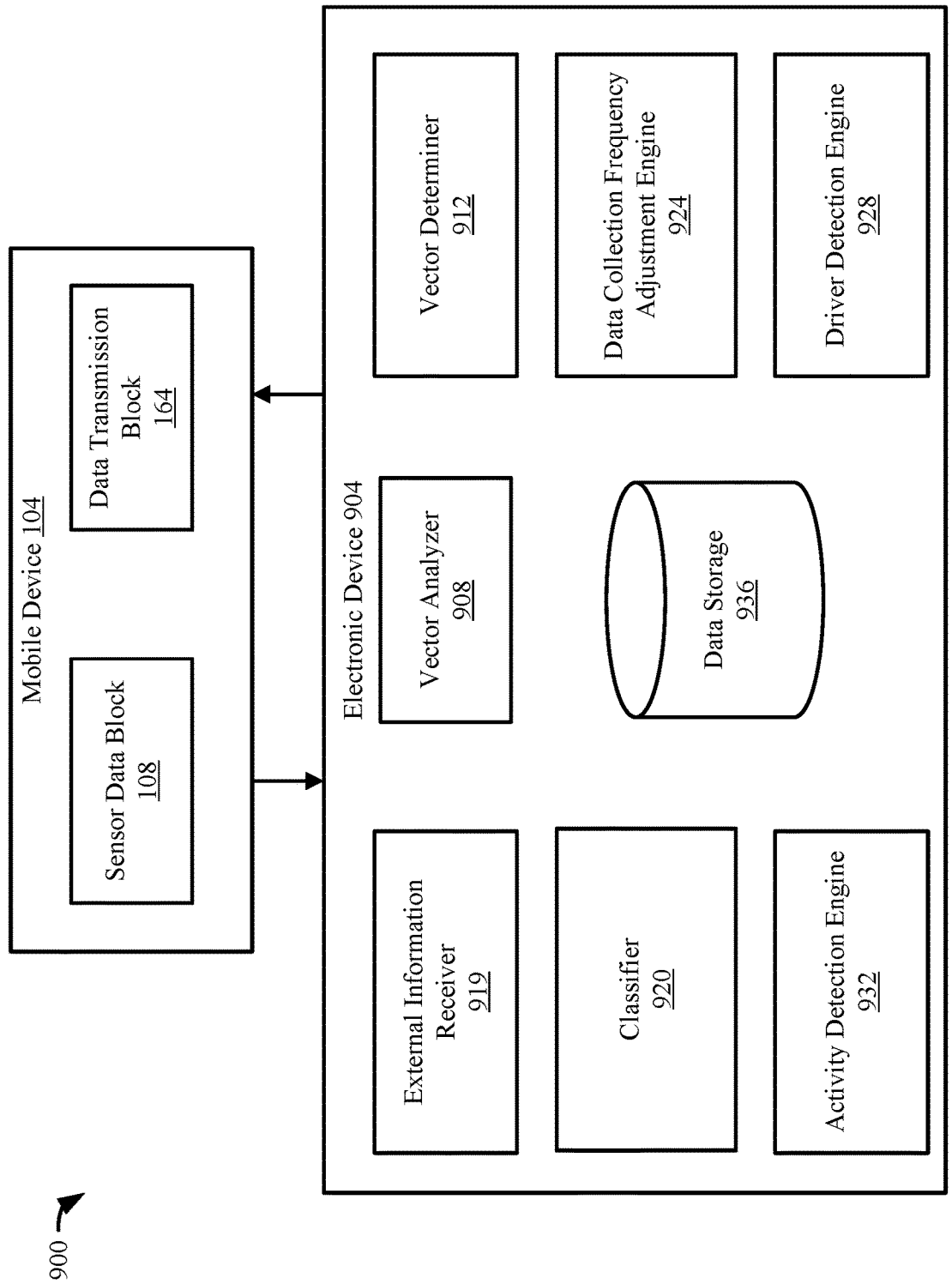
FIG. 9 depicts a simplified block diagram illustrating an example of another system for collecting driving data according to some embodiments.

FIG. 9 is a simplified block diagram illustrating an example of another system 900 for collecting driving data according to some aspects of the present invention. System 900 may include electronic device 904, which may be incorporated within mobile device 104 (e.g., as specialized hardware or software) or may be a separate device (or execute on a separate device) that communicates with the mobile device 104. For instance, as a separate device, electronic device 904 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such as a cloud environment or the like), a combination thereof (e.g., as a distributed process), or the like. In some examples, the electronic device 904 may provide functionality using components including, but not limited to: a vector analyzer 908, a vector determiner 912, an external information receiver 919, and a classifier 920 (e.g., a machine learning model), a data collection frequency engine 924, a driver detection engine 928, and activity detection engine 932. Each component may include one or more processors (not shown) and memory (not shown). Instructions stored in the memory of a component may be executed by the one or more processors to provide the functionality of the component. Alternatively, one or more processors of electronic device 904 (not shown) may execute instructions stored in a central memory of electronic device 904 to provide the functionality of the components. The electronic device 904 may also include a data storage 936. In some instances, one or more of the components operating on electronic device 904 may be stored in memory 152 or storage 156 of mobile device 104 and/or executed by processor 148 of mobile device 104.

One or more of sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms a "drive" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information etc.) can be retrieved and correlated with collected driving data.

In some examples, a display of a mobile device (such as mobile device 104) can show representations of driving data collected by the one or more sensors or generated by any of components. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving, etc.), estimates of the occurrence of different driving events during a drive for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the examples. Further disclosure regarding scoring can be found in U.S. Pat. No. 11,072,339, entitled "SYSTEMS AND METHODS FOR SCORING DRIVING TRIPS", herein incorporated by reference in its entirety.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements that configure a system to operate as designed. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory and later used to configure the system upon execution of the instructions. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure It is also understood that the examples and examples described herein are for illustrative purposes only and that various modifications or changes in light thereof will be suggested to persons skilled in the art and are to be included within the spirit and purview of this application and scope of the appended claims.

What is claimed is:

1. A method comprising:
   receiving a notification;
   thereafter, in response to receiving the notification, executing a data collection application over a time interval;
   requesting, by the data collection application executing over the time interval, a set of sensor measurements from an operating system of a mobile device, the set of sensor measurements having been collected prior to receiving the notification and before the execution of the data collection application;
   receiving, by the data collection application and from the operating system, the set of sensor measurements;
   identifying one or more events based on the set of sensor measurements, wherein the one or more events occurred during collection of the set of sensor measurements;
   determining that the set of sensor measurements cannot be transmitted during the time interval;
   defining a first subset of the set of sensor measurements; and
   transmitting the first subset of the set of sensor measurements to a server during the time interval.

2. The method of claim 1, wherein the data collection application terminates upon expiration of the time interval.

3. The method of claim 1, wherein identifying the one or more events comprises detecting the one or more events based on the set of sensor measurements.

4. The method of claim 1, further comprising processing, by the mobile device, the set of sensor measurements by either:
   down-sampling the set of sensor measurements to provide an abbreviated data set; or
   generating metadata based on the set of sensor measurements.

5. The method of claim 1, wherein the notification is received, by the mobile device, from a server at dynamic intervals based on previously transmitted sensor measurements.

6. The method of claim 1, further comprising generating the notification by a local process of the mobile device based on an increase in a likelihood of motion of the mobile device.

7. The method of claim 1, further comprising:
   receiving a subsequent notification;
   executing, in response to receiving the subsequent notification, the data collection application over a subsequent time interval;
   requesting, by the data collection application, a new set of sensor measurements from the operating system of the mobile device, the new set of sensor measurements having been collected after receiving the notification and prior to receiving the subsequent notification;
   receiving, by the data collection application and from the operating system, the new set of sensor measurements; and
   transmitting, by the data collection application, a second subset of the set of sensor measurements and the new set of sensor measurements to the server during the subsequent time interval, wherein the second subset of the set of sensor measurements includes a remaining portion of the set of sensor measurements not included in the first subset of the set of sensor measurements.

8. The method of claim 1, further comprising:
   transmitting, by the data collection application, the one or more events to the server during the time interval.

9. The method of claim 1, wherein the set of sensor measurements includes sensor measurements collected between a first time when the notification was received and a second time when a previous notification was received.

10. The method of claim 1, wherein a size of the time interval is based on previously transmitted sensor measurements.

11. The method of claim 1, further comprising instructing the operating system of the mobile device to store additional sensor measurements after receiving the set of sensor measurements.

12. The method of claim 1, wherein the one or more events includes at least one of: a hard braking event, a vehicle collision, a missed drive, an indication of distracted driving, an indication of mobile phone use, an indication of speeding, or an indication of aggressive driving.

13. The method of claim 1, wherein the notification is received by the mobile device from a remote cloud server or from an internal process of the mobile device.

14. A method comprising:
receiving, by a mobile device, a notification generated as a result of an indication from a motion sensor of the mobile device;
thereafter, in response to receiving the notification, executing a data collection application;
receiving, by the data collection application, a first set of sensor measurements from at least one sensor of the mobile device;
determining that the mobile device has been stationary for longer than a threshold time interval;
deleting the first set of sensor measurements; and
terminating the data collection application.

15. The method of claim 14, further comprising transmitting, by the data collection application, at least a portion of the first set of sensor measurements to a server.

16. The method of claim 15, further comprising:
requesting, from an operating system of the mobile device, a second set of sensor measurements that were collected prior to receiving the notification;
receiving, from the operating system of the mobile device, the second set of sensor measurements; and
transmitting, by the data collection application, the second set of sensor measurements with the at least a portion of the first set of sensor measurements.

17. The method of claim 14, further comprising detecting one or more events based on at least a portion of the first set of sensor measurements, wherein the one or more events occurred during collection of the first set of sensor measurements.

18. The method of claim 14, wherein the motion sensor is a virtual sensor configured to generate the indication based on measurements collected from an accelerometer.

19. The method of claim 14, further comprising:
determining that a the mobile device is positioned within a moving vehicle; and
transmitting, by the data collection application, at least a portion of the first set of sensor measurements.

20. The method of claim 13, wherein the data collection application is executed on the mobile device.

* * * * *